(12) United States Patent
Wellington et al.

(10) Patent No.: US 8,394,254 B2
(45) Date of Patent: *Mar. 12, 2013

(54) CRUDE PRODUCT COMPOSITION

(75) Inventors: Scott Lee Wellington, Bellaire, TX (US); Stanley Nemec Milam, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/087,084

(22) Filed: Apr. 14, 2011

(65) Prior Publication Data

US 2011/0210043 A1 Sep. 1, 2011

Related U.S. Application Data

(62) Division of application No. 11/014,004, filed on Dec. 16, 2004, now Pat. No. 8,025,791.

(60) Provisional application No. 60/618,814, filed on Oct. 14, 2004, provisional application No. 60/531,506, filed on Dec. 19, 2003.

(51) Int. Cl.
C10M 101/02 (2006.01)
C10L 1/00 (2006.01)

(52) U.S. Cl. ............... 208/14; 208/15; 208/16; 208/17; 585/14; 44/300

(58) Field of Classification Search .............. 208/14
See application file for complete search history.

(56) References Cited

U.S. PATENT DOCUMENTS

| 1,111,580 | A | 9/1914 | Herber | |
|---|---|---|---|---|
| 2,362,670 | A | 1/1942 | Schulze | 23/134 |
| 2,559,325 | A | 7/1951 | Spillane | 23/177 |
| 2,652,319 | A | 9/1953 | Sweetser et al. | 48/206 |
| 2,738,307 | A | 3/1956 | Beckberger | 196/49 |
| 2,777,679 | A | 1/1957 | Ljungström | 262/3 |
| 2,854,496 | A | 9/1958 | Wright | 260/683.9 |
| 3,051,645 | A | 8/1962 | Wilson et al. | |
| 3,080,435 | A | 3/1963 | Nager | |
| 3,081,256 | A | 3/1963 | Hendal et al. | |
| 3,136,714 | A | 6/1964 | Gibson et al. | |
| 3,139,398 | A | 6/1964 | Bray et al. | 208/59 |
| 3,164,545 | A | 1/1965 | Mattox | 208/230 |
| 3,179,584 | A | 4/1965 | Hamner et al. | 208/106 |
| 3,252,773 | A | 5/1966 | Solomon et al. | 48/202 |
| 3,387,054 | A | 6/1968 | Schuman | 260/680 |
| 3,417,029 | A | 12/1968 | McMahon | 252/455 |
| 3,553,279 | A | 1/1971 | Bawa | 260/683 |

(Continued)

FOREIGN PATENT DOCUMENTS

| CA | 1121293 | 4/1982 |
|---|---|---|
| CA | 1195639 | 10/1985 |

(Continued)

OTHER PUBLICATIONS

"Refining Processes 2000", *Hydrocarbon Processing*, Gulf Publishing Co., Houston, TX, 2000, pp. 87-142.

(Continued)

*Primary Examiner* — Ellen McAvoy

(57) ABSTRACT

A crude product composition is provided. The crude product composition contains from 0.001 wt. % to 5 wt. % residue. The crude product composition contains hydrocarbons having a boiling point in the ranges of at most 204° C., from 204° C. to 300° C., from 300° C. to 400° C., and from 400° C. to 538° C. The hydrocarbons boiling in a range of at most 204° C. comprise paraffins, where the paraffins comprise iso-paraffins and n-paraffins, and the weight ratio of iso-paraffins to n-paraffins is at most 1.4.

7 Claims, 9 Drawing Sheets

U.S. PATENT DOCUMENTS

| | | |
|---|---|---|
| 3,558,474 A | 1/1971 | Gleim et al. |
| 3,622,495 A | 11/1971 | Gatsis et al. ..................... 208/59 |
| 3,663,431 A | 5/1972 | Wagner ......................... 208/143 |
| 3,677,932 A | 7/1972 | Hardesty et al. |
| 3,679,577 A | 7/1972 | Wantland et al. |
| 3,714,031 A | 1/1973 | van der Toorn et al. |
| 3,715,303 A | 2/1973 | Wennerberg et al. .......... 208/112 |
| 3,716,478 A | 2/1973 | Kodera et al. |
| 3,716,479 A | 2/1973 | Weisz et al. |
| 3,740,193 A | 6/1973 | Aldridge et al. ................ 48/202 |
| 3,745,109 A | 7/1973 | Heredy at al. |
| 3,759,677 A | 9/1973 | White ............................. 48/209 |
| 3,765,851 A | 10/1973 | White ............................. 48/209 |
| 3,766,054 A | 10/1973 | Weisz et al. |
| 3,786,138 A | 1/1974 | Shalit et al. |
| 3,803,023 A | 4/1974 | Hamner .......................... 208/46 |
| 3,812,028 A | 5/1974 | Wennerberg et al. |
| 3,816,298 A | 6/1974 | Aldridge ....................... 208/112 |
| 3,841,981 A | 10/1974 | Layng |
| 3,847,797 A | 11/1974 | Pasternak et al. |
| 3,849,242 A | 11/1974 | Takeya et al. |
| 3,862,025 A | 1/1975 | Steele et al. .................. 208/109 |
| 3,876,532 A | 4/1975 | Plundo et al. |
| 3,887,455 A | 6/1975 | Hamner et al. |
| 3,890,432 A | 6/1975 | White ........................... 423/655 |
| 3,901,792 A | 8/1975 | Wolk et al. |
| 3,923,635 A | 12/1975 | Schulman et al. |
| 3,948,759 A | 4/1976 | King et al. |
| 3,957,620 A | 5/1976 | Fukui et al. |
| 3,960,706 A | 6/1976 | McCollum et al. ........... 208/112 |
| 3,960,708 A | 6/1976 | McCollum et al. |
| 4,003,823 A | 1/1977 | Baird, Jr. et al. ............... 208/108 |
| 4,003,824 A | 1/1977 | Baird, Jr. et al. ............... 208/108 |
| 4,007,109 A | 2/1977 | Baird, Jr. et al. ............... 208/108 |
| 4,017,379 A | 4/1977 | Iida et al. ........................ 208/68 |
| 4,051,015 A | 9/1977 | Bearden, Jr. et al. |
| 4,067,799 A | 1/1978 | Bearden, Jr. et al. .......... 208/112 |
| 4,087,348 A | 5/1978 | Baird, Jr. et al. ............... 208/108 |
| 4,087,349 A | 5/1978 | Baird, Jr. ....................... 208/108 |
| 4,115,324 A | 9/1978 | Ozaki et al. |
| 4,119,528 A | 10/1978 | Baird, Jr. et al. |
| 4,127,470 A | 11/1978 | Baird, Jr. et al. |
| 4,212,729 A | 7/1980 | Hensley, Jr. et al. .......... 208/210 |
| 4,214,977 A | 7/1980 | Ranganathan et al. ....... 208/108 |
| 4,224,140 A | 9/1980 | Fujimori et al. |
| 4,231,858 A | 11/1980 | Seitzer et al. |
| 4,256,654 A | 3/1981 | Schlinger et al. ...... 260/449.6 R |
| 4,271,042 A | 6/1981 | Oleck et al. |
| 4,276,153 A | 6/1981 | Yoshitake et al. |
| 4,313,818 A | 2/1982 | Aldridge et al. .............. 208/108 |
| 4,336,034 A | 6/1982 | Lang et al. ...................... 48/202 |
| 4,357,229 A | 11/1982 | Bearden, Jr. et al. ........... 208/10 |
| 4,376,037 A | 3/1983 | Dahlberg et al. |
| 4,389,301 A | 6/1983 | Dahlberg et al. |
| 4,424,110 A | 1/1984 | Bearden, Jr. et al. ........... 208/10 |
| 4,427,535 A | 1/1984 | Nongbri et al. |
| 4,437,980 A | 3/1984 | Heredy et al. |
| 4,438,218 A | 3/1984 | Boorman et al. ............. 502/220 |
| 4,460,707 A | 7/1984 | Simpson |
| 4,473,462 A | 9/1984 | Swanson |
| 4,498,979 A | 2/1985 | Eberly, Jr. |
| 4,500,323 A | 2/1985 | Siegfried et al. ............. 48/197 R |
| 4,541,841 A | 9/1985 | Reinhardt ................... 48/197 R |
| 4,564,439 A | 1/1986 | Kuehler et al. |
| 4,591,426 A | 5/1986 | Krasuk et al. |
| 4,609,456 A | 9/1986 | Deschamps et al. .......... 208/112 |
| 4,626,412 A | 12/1986 | Ebner et al. |
| 4,659,454 A | 4/1987 | Varghese et al. |
| 4,661,265 A | 4/1987 | Olson et al. |
| 4,665,261 A | 5/1987 | Mazurek |
| 4,666,878 A | 5/1987 | Jacobson et al. ............. 502/221 |
| 4,729,980 A | 3/1988 | Ramirez de Aqudelo et al. ............................. 502/221 |
| 4,743,357 A | 5/1988 | Patel et al. .................... 208/113 |
| 4,810,365 A | 3/1989 | Dohler et al. |
| 4,832,829 A | 5/1989 | de Agudelo et al. ...... 297/251 R |
| 4,886,594 A | 12/1989 | Miller .......................... 208/210 |
| 4,888,104 A | 12/1989 | Ramirez de Aqudelo et al. ............................. 208/112 |
| 4,917,789 A | 4/1990 | Butler et al. |
| 4,937,218 A | 6/1990 | Ramirez de Aqudelo et al. |
| 4,937,221 A | 6/1990 | Erekson et al. |
| 4,941,966 A | 7/1990 | Merz et al. |
| 4,945,078 A | 7/1990 | Erekson et al. ............... 502/202 |
| 4,954,473 A | 9/1990 | Gatsis |
| 4,956,327 A | 9/1990 | Erekson et al. ............... 502/216 |
| 4,963,247 A | 10/1990 | Belinko et al. ................ 208/112 |
| 4,976,848 A | 12/1990 | Johnson |
| 5,039,489 A | 8/1991 | Gleaves et al. |
| 5,064,523 A | 11/1991 | Kretschmar et al. |
| 5,108,581 A | 4/1992 | Aldridge et al. |
| 5,124,024 A | 6/1992 | Krzywicki et al. |
| 5,164,078 A | 11/1992 | Hung et al. |
| 5,166,118 A | 11/1992 | Kretschmar et al. |
| 5,264,183 A | 11/1993 | Ebner et al. |
| 5,266,186 A | 11/1993 | Kaplan ..................... 208/48 AA |
| 5,279,801 A | 1/1994 | Colombet et al. ............ 423/21.1 |
| 5,288,681 A | 2/1994 | Gatsis |
| 5,296,130 A | 3/1994 | Kriz et al. ..................... 208/107 |
| 5,300,217 A | 4/1994 | Simpson et al. |
| 5,316,996 A | 5/1994 | Itoh ............................... 502/238 |
| 5,320,741 A | 6/1994 | Johnson et al. |
| 5,358,629 A | 10/1994 | Tamalis et al. ................ 208/112 |
| 5,374,348 A | 12/1994 | Sears et al. .................... 208/107 |
| 5,382,349 A | 1/1995 | Yoshita et al. ................. 208/49 |
| 5,468,372 A | 11/1995 | Seamans et al. |
| 5,474,977 A | 12/1995 | Gatsis |
| 5,529,968 A | 6/1996 | Sudhakar et al. |
| 5,620,592 A | 4/1997 | Threlkel |
| 5,688,736 A | 11/1997 | Seamans et al. |
| 5,744,025 A | 4/1998 | Boon et al. |
| 5,817,229 A | 10/1998 | Sudhakar et al. |
| 5,847,249 A | 12/1998 | Maraschino |
| 5,851,381 A | 12/1998 | Tanaka et al. |
| 5,871,636 A | 2/1999 | Trachte et al. |
| 5,885,441 A | 3/1999 | Pereira et al. |
| 5,897,769 A | 4/1999 | Trachte et al. |
| 5,914,030 A | 6/1999 | Bearden et al. |
| 5,928,497 A | 7/1999 | Iaccino .......................... 208/212 |
| 5,928,501 A | 7/1999 | Sudhakar et al. |
| 5,928,502 A | 7/1999 | Bearden et al. |
| 5,954,945 A | 9/1999 | Cayton et al. ................. 208/108 |
| 5,961,815 A | 10/1999 | Hickey et al. |
| 6,063,266 A | 5/2000 | Grande et al. |
| 6,136,179 A | 10/2000 | Sherwood, Jr. et al. |
| 6,149,799 A | 11/2000 | Raybaud et al. ................ 208/49 |
| 6,203,313 B1 | 3/2001 | Holmes et al. |
| 6,203,695 B1 | 3/2001 | Harle et al. |
| 6,210,564 B1 | 4/2001 | Brons et al. |
| 6,218,333 B1 | 4/2001 | Gabrielov et al. |
| 6,274,530 B1 | 8/2001 | Cayton et al. ................. 502/216 |
| 6,277,269 B1 | 8/2001 | Myers et al. |
| 6,290,841 B1 | 9/2001 | Gabrielov et al. |
| 6,342,152 B1 | 1/2002 | Yoshita .......................... 208/108 |
| 6,454,932 B1 | 9/2002 | Baldassari et al. |
| 6,509,291 B2 | 1/2003 | Eijsbouts |
| 6,524,469 B1 | 2/2003 | Schucker |
| 6,547,957 B1 | 4/2003 | Sudhakar et al. |
| 6,582,590 B1 | 6/2003 | Riley et al. |
| 6,620,313 B1 | 9/2003 | Demmin et al. |
| 6,635,599 B1 | 10/2003 | Eijsbouts et al. |
| 6,652,738 B2 | 11/2003 | Eijsbouts et al. |
| 6,776,897 B2* | 8/2004 | Bacha et al. ..................... 208/14 |
| 6,841,062 B2 | 1/2005 | Reynolds ....................... 208/89 |
| 6,972,084 B1* | 12/2005 | Nakashima et al. ............ 208/15 |
| 7,179,364 B2* | 2/2007 | O'Rear et al. .................. 208/15 |
| 7,311,814 B2* | 12/2007 | Guyomar et al. ............. 208/108 |
| 7,402,547 B2* | 7/2008 | Wellington et al. ........... 502/222 |
| 7,413,646 B2 | 8/2008 | Wellington et al. ........... 208/108 |
| 7,416,653 B2 | 8/2008 | Wellington et al. ........... 208/108 |
| 7,431,821 B2* | 10/2008 | O'Rear et al. .................. 208/14 |
| 7,479,168 B2* | 1/2009 | O'Rear et al. .................. 44/412 |
| 7,692,049 B2* | 4/2010 | Kuechler et al. ................ 585/1 |
| 7,811,445 B2* | 10/2010 | Wellington et al. ............. 208/14 |
| 7,828,958 B2* | 11/2010 | Wellington et al. ............. 208/14 |
| 8,163,166 B2* | 4/2012 | Wellington et al. ............. 208/14 |

| | | |
|---|---|---|
| 2002/0056664 A1 | 5/2002 | Chabot |
| 2002/0070147 A1 | 6/2002 | Sonnemans et al. .......... 208/210 |
| 2002/0155045 A1 | 10/2002 | Kumagai et al. |
| 2003/0000867 A1 | 1/2003 | Reynolds |
| 2003/0024854 A1 | 2/2003 | Wen et al. |
| 2003/0042174 A1 | 3/2003 | Austin |
| 2003/0062163 A1 | 4/2003 | Moulton et al. |
| 2003/0070808 A1 | 4/2003 | Allison |
| 2003/0070963 A1 | 4/2003 | Zimmermann et al. |
| 2003/0085155 A1 | 5/2003 | Chabot |
| 2003/0111391 A1 | 6/2003 | Bhan |
| 2003/0130118 A1 | 7/2003 | Koyama et al. |
| 2003/0149317 A1 | 8/2003 | Rendina |
| 2003/0150778 A1 | 8/2003 | Haluska et al. |
| 2003/0170873 A1 | 9/2003 | Ranson et al. |
| 2003/0170874 A1 | 9/2003 | Ranson et al. |
| 2003/0196884 A1 | 10/2003 | Dell'Orfano |

FOREIGN PATENT DOCUMENTS

| | | |
|---|---|---|
| DE | 25 58 505 | 11/1976 |
| DE | 25 30 600 | 1/1977 |
| EP | 0 024 104 B1 | 3/1983 |
| EP | 0 306 050 A1 | 3/1989 |
| EP | 0429132 | 11/1990 |
| EP | 0318125 | 6/1992 |
| EP | 0400743 | 8/1994 |
| EP | 0721917 | 7/1996 |
| EP | 1 153 107 | 4/2003 |
| FR | 2 780 307 A1 | 12/1999 |
| GB | 286206 | 12/1928 |
| GB | 1 310 283 | 3/1973 |
| GB | 1 397 130 | 6/1975 |
| GB | 2120675 | 12/1983 |
| GB | 1405664 | 9/1992 |
| JP | 54-107906 | 8/1979 |
| JP | 5618490 | 9/1981 |
| JP | 2002-129171 | 5/2002 |
| RU | 2186090 | 7/2002 |
| WO | 00/18854 | 4/2000 |
| WO | 02/33029 | 4/2002 |
| WO | 02/086022 A1 | 4/2002 |
| WO | 03/042333 | 5/2003 |
| WO | WO2005066302 | 7/2005 |

OTHER PUBLICATIONS

Brauer, ed. *Handbook of Preparative Inorganic Chemistry*, vol. 2., Second Edition, Academic Press Inc., New York, N.Y., 1965, p. 1507.

Nickless, ed., *Inorganic Sulfur Chemistry*, Elsevier, Amsterdam, 1968, pp. 669-747.

Heithaus, "Measurement and Significance of Asphaltene Peptization," *Journal of the Institute of Petroleum*, 1962, vol. 48(458) pp. 45-53.

* cited by examiner

| TABLE 2 | | |
|---|---|---|
| Weight Percentage of Hydrocarbon Components in Crude Feed and Non-Condensable Hydrocarbons Produced at 8000 $Nm^3/m^3$ Using the TMS Catalyst | | |
| Component | Crude Feed | Non-Condensable Hydrocarbons |
| Example | 2 | 2 |
| Methane, wt% | 0 | 26.9 |
| Ethane, wt% | 0 | 19 |
| Ethylene, wt% | 0 | 1.5 |
| Propane, wt% | 0 | 18.9 |
| Propylene, wt% | 0 | 5 |
| n-Butane, wt% | 0 | 14.4 |
| Iso-butane, wt% | 0 | 2.8 |

TABLE 1

| Property | Crude Feed | Crude Product | Crude Product |
|---|---|---|---|
| Example | | 2 | 4 |
| Ratio of hydrogen to crude feed, Nm³/m³ | ----- | 8000 | 16000 |
| Hydrogen Content, wt% | 10.6 | 11.6 | 11.5 |
| Carbon Content, wt% | 84.3 | 86 | 85.9 |
| H/C ratio | 1.5 | 1.6 | 1.6 |
| Oxygen Content, wt% | 0.5 | ---- | ---- |
| Nitrogen Content, wt% | 0.4 | 0.3 | 0.3 |
| Sulfur Content, wt% | 4.1 | 1.8 | 2.0 |
| Nickel Content, wtppm | 63.6 | <1 | <2 |
| Vanadium Content, wtppm | 149 | <1 | <1 |
| Iron Content, wtppm | 7.3 | <1 | <1 |
| Micro-Carbon Residue, wt% | 13.73 | * | * |
| $C_5$ Asphaltenes, wt% | 18.72 | * | * |
| TAN | 1.1 | <03/12 | <0.1 |
| Density at 15.56 °C (60 °F), g/cm³ | 1.0034 | 0.916 | 0.9301 |
| API Gravity at 15.56 °C (60 °F) | 9.38 | 22.82 | 20.6 |
| Viscosity, Pa·s (cP) | 21.7 (21,725) @ 37.8 °C (100 °F) | 0.008 (7.9) @ 40 °C (104 °F) | 0.017 (17.2) @ 40 °C (104 °F) |
| Boiling Range Distribution | ASTM D5307 °C (°F) | ASTM D2887 °C (°F) | ASTM D2887 °C (°F) |
| IBP | 207 (405) | 54 (129) | 97 (206) |
| 5% | 302 (576) | 128 (262) | 187 (369) |
| 10% | 336 (636) | 178 (353) | 238 (461) |
| 15% | 363 (683) | 222 (431) | 273 (524) |
| 30% | 422 (792) | 301 (574) | 342 (647) |
| 50% | 496 (925) | 364 (687) | 402 (756) |
| 60% | 537 (999) | 391 (736) | 427 (801) |
| 70% | >538 (1000) | 417 (783) | 452 (845) |
| 90% | >538 (1000) | 480 (896) | 506 (942) |
| 95% | >538 (1000) | 505 (941) | 527 (980) |
| Final Boiling Point | >538 (1000) | 553 (1028) | 581 (1078) |
| Weight Percentage of Components in Crude Feed and Crude Product (ASTM D2892 and D5236) | | | |
| Component | Crude Feed | Crude Product | Crude Product |
| Naptha Components wt% | 0.14 | 11.8 | 7.5 |
| Kerosene Components wt% | 0.80 | 8.4 | 7.7 |
| Diesel Components wt% | 6.42 | 20.7 | 18.8 |
| Distillate Components wt%, (kerosene plus diesel) | 7.20 | 29.1 | 26.5 |
| VGO Component, wt% | 38.7 | 55.6 | 61.1 |
| Residue, wt% | 53.8 | 2.8 | 4.4 |
| Coke, wt% | Not detected | Not detected | Not detected |

FIG. 8

Table 3

| Example | 2 | | | | 4 | | | |
|---|---|---|---|---|---|---|---|---|
| Ratio of hydrogen to crude feed, $Nm^3/m^3$ | 8000 | | | | 16000 | | | |
| | Naphtha | Kerosene | Diesel | VGO | Naphtha | Kerosene | Diesel | VGO |
| Hydrogen Content, wt% | 13.88 | 12.19 | 11.75 | 11.01 | 13.54 | 12.18 | 11.78 | 11.08 |
| Carbon Content, wt% | 85.2 | 85.1 | 85.77 | 86.41 | 85.34 | 85.01 | 85.54 | 86.21 |
| Nitrogen Content, wt% | 0.12 | 0.17 | 0.19 | 0.42 | 0.17 | 0.16 | 0.16 | 0.40 |
| Sulfur Content | 0.65 | 2.38 | 2.13 | 1.87 | 0.95 | 2.46 | 2.25 | 2.01 |
| n-Paraffins, wt% | 20.5 | | | | 17.4 | | | |
| Isoparaffins, wt% | 25.4 | | | | 22.1 | | | |
| Olefins, wt% | 7.8 | Non-Aromatic 62.6 | Non-Aromatic 52.0 | Non-Aromatic 43.3 | 4.8 | Non-Aromatic 62.5 | Non-Aromatic 50.1 | Non-Aromatic 37.8 |
| Naphthenes, wt% | 16.7 | | | | 13.4 | | | |
| $C_{14}+$, wt% | 0.1 | | | | 0.1 | | | |
| Other components, wt% | 9.9 | | | | 18.6 | | | |
| Multi-substituted aromatics, wt% | 13.2 | --- | --- | --- | 16.1 | --- | --- | --- |
| Monocyclic ring Aromatics, wt% | 19.5 | 23.9 | --- | --- | 22.7 | 23.8 | --- | --- |
| Benzene, wt% | 0.3 | ---- | --- | --- | 0.12 | --- | --- | --- |
| Polyaromatic, wt% | 0.3 | 13.5 | --- | --- | 0.8 | 13.7 | --- | --- |
| Total Aromatics, wt% | 19.7 | 37.4 | 48.0 | 56.7 | 23.5 | 37.5 | 49.9 | 62.3 |
| Freezing Point, °C | | -43.4 | | | | -39.5 | | |
| Octane Number | 74.9 | | | | 80.4 | | | |

FIG. 10

Table 4

| Example Number | Catalyst | Contacting Temperature, °C | Steam, flow rate, g/min | $H_2$ flow rate at 0.1 MPa, $cm^3$/min | Crude Product, wt% | Gas Produced, wt% | Coke Produced, wt% | Sulfur Content in Crude Product, wt% | Atomic H/C in Crude Product |
|---|---|---|---|---|---|---|---|---|---|
| 17 | $K_2CO_3$/$Rb_2CO_3$/$Cs_2CO_3$ | 375 | 0.4 | 250 | 79 | 2 | 17 | 1 | 1.8 |
| 18 | $K_2CO_3$/$Rb_2CO_3$/$Cs_2CO_3$ | 500 to 600 | 0 at 500 °C; 0.4 at 600 °C | 250 | 85 | 5 | 9 | 0.8 | 1.8 |
| 19 | $CaCO_3$ | 500 | 0.4 | 250 | 82 | 9 | 9 | >1 | 1.7 |
| 20 | SiC | 500 | 0 | 250 | 53 | 25 | 22 | 3.6 | 1.5 |

FIG. 16

CRUDE PRODUCT COMPOSITION

PRIORITY

This application is a divisional of U.S. patent application Ser. No. 11/014,004 entitled "SYSTEMS AND METHODS FOR PRODUCING A CRUDE PRODUCT" filed on Dec. 16, 2004, now U.S. Pat. No. 8,025,791 which claimed priority from Provisional Patent Application No. 60/531,506 entitled "METHODS OF PREPARING IMPROVED CRUDE FEED" filed on Dec. 19, 2003, and Provisional Patent Application No. 60/618,814 entitled "SYSTEMS AND METHODS OF PRODUCING A CRUDE PRODUCT" filed on Oct. 14, 2004.

FIELD OF THE INVENTION

The present invention generally relates to crude product compositions produced by systems and methods for treating crude feeds.

DESCRIPTION OF RELATED ART

Crudes that have one or more unsuitable properties that do not allow the crudes to be economically transported, or processed using conventional facilities, are commonly referred to as "disadvantaged crudes".

Disadvantaged crudes often contain relatively high levels of residue. Such crudes tend to be difficult and expensive to transport and/or process using conventional facilities. High residue crudes may be treated at high temperatures to convert the crude to coke. Alternatively, high residue crudes are typically treated with water at high temperatures to produce less viscous crudes and/or crude mixtures. During processing, water removal from the less viscous crudes and/or crude mixtures may be difficult using conventional means.

Disadvantaged crudes may include hydrogen deficient hydrocarbons. When processing hydrogen deficient hydrocarbons, consistent quantities of hydrogen generally need to be added, particularly if unsaturated fragments resulting from cracking processes are produced. Hydrogenation during processing, which typically involves the use of an active hydrogenation catalyst, may also be needed to inhibit unsaturated fragments from forming coke. Processes such as reforming that are used to produce hydrogen are generally endothermic and, typically, require additional heat. Hydrogen and/or heat is costly to produce and/or costly to transport to treatment facilities.

Coke may form and/or deposit on catalyst surfaces at a rapid rate during processing of disadvantaged crudes. It may be costly to regenerate the catalytic activity of a catalyst contaminated by coke. High temperatures used during regeneration may also diminish the activity of the catalyst and/or cause the catalyst to deteriorate.

Disadvantaged crudes may include acidic components that contribute to the total acid number ("TAN") of the feed. Disadvantaged crudes with a relatively high TAN may contribute to corrosion of metal components during transporting and/or processing of the disadvantaged crudes. Removal of acidic components from disadvantaged crudes may involve chemically neutralizing acidic components with various bases. Alternately, corrosion-resistant metals may be used in transportation equipment and/or processing equipment. The use of corrosion-resistant metal often involves significant expense, and thus, the use of corrosion-resistant metal in existing equipment may not be desirable. Another method to inhibit corrosion may involve addition of corrosion inhibitors to disadvantaged crudes before transporting and/or processing of the disadvantaged crudes. The use of corrosion inhibitors may negatively affect equipment used to process the crudes and/or the quality of products produced from the crudes.

Disadvantaged crudes may contain relatively high amounts of metal contaminants, for example, nickel, vanadium, and/or iron. During processing of such crudes, metal contaminants, and/or compounds of metal contaminants, may deposit on a surface of the catalyst or the void volume of the catalyst. Such deposits may cause a decline in the activity of the catalyst.

Disadvantaged crudes often include organically bound heteroatoms (for example, sulfur, oxygen, and nitrogen). Organically bound heteroatoms may, in some situations, have an adverse effect on catalysts. Alkali metal salts and/or alkaline-earth metal salts have been used in processes for desulfurization of residue. These processes tend to result in poor desulfurization efficiency, production of oil insoluble sludge, poor demetallization efficiency, formation of substantially inseparable salt-oil mixtures, utilization of large quantities of hydrogen gas, and/or relatively high hydrogen pressures.

Some processes for improving the quality of crude include adding a diluent to disadvantaged crudes to lower the weight percent of components contributing to the disadvantaged properties. Adding diluent, however, generally increases costs of treating disadvantaged crudes due to the costs of diluent and/or increased costs to handle the disadvantaged crudes. Addition of diluent to a disadvantaged crude may, in some situations, decrease stability of such crude.

U.S. Pat. No. 3,847,797 to Pasternak et al.; U.S. Pat. No. 3,948,759 to King et al.; U.S. Pat. No. 3,957,620 to Fukui et al.; U.S. Pat. No. 3,960,706 to McCollum et al.; U.S. Pat. No. 3,960,708 to McCollum et al.; U.S. Pat. No. 4,119,528 to Baird, Jr. et al.; U.S. Pat. No. 4,127,470 to Baird, Jr. et al.; U.S. Pat. No. 4,437,980 to Heredy et al.; and U.S. Pat. No. 4,665,261 to Mazurek; all of which are incorporated herein by reference, describe various processes and systems used to treat crudes. U.S. Published Application Nos. 20050133405; 20050133406; 20050135997; 20050139512; 20050145536; 20050145537; 20050145538; 20050155906; 20050167321; 20050167322; 20050167323; 20050170952; and 20050173298 to Wellington et al. all of which are incorporated herein by reference, describe contact of a feed in the presence of a catalyst to produce a crude product. The process, systems, and catalysts described in these patents, however, have limited applicability because of many of the technical problems set forth above.

In sum, disadvantaged crudes generally have undesirable properties (for example, relatively high residue, a tendency to corrode equipment, and/or a tendency to consume relatively large amounts of hydrogen during treatment). Other undesirable properties include relatively high amounts of undesirable components (for example, relatively high TAN, organically bound heteroatoms, and/or metal contaminants). Such properties tend to cause problems in conventional transportation and/or treatment facilities, including increased corrosion, decreased catalyst life, process plugging, and/or increased usage of hydrogen during treatment. Thus, there is a significant economic and technical need for improved systems, methods, and/or catalysts for conversion of disadvantaged crudes into crude products with properties that are more desirable.

SUMMARY OF THE INVENTION

Inventions described herein generally relate to systems and methods for contacting a feed with one or more catalysts to produce a total product comprising a crude product and, in some embodiments, non-condensable gas. Inventions described herein also generally relate to compositions that have novel combinations of components therein. Such compositions can be obtained by using the systems and methods described herein.

In certain embodiments, the invention provides a system for producing a total product, comprising: a contacting zone, the contacting zone being configured to fluidize a supported inorganic salt catalyst in the presence of a feed, steam and a hydrogen source to produce the total product; a regeneration zone configured to receive at least a portion of the supported inorganic salt catalyst from the contacting zone and remove at least a portion of contaminants from the supported inorganic salt catalyst; and a recovery zone, the recovery zone being configured to receive combustion gas from the regeneration zone, wherein the recovery zone is configured to separate at least a portion of inorganic salts from the combustion gas.

In certain embodiments, the invention provides a method of producing total product, comprising: providing a feed to a contacting zone; providing an inorganic salt catalyst to the contacting zone; contacting the inorganic salt catalyst with the feed in the presence of a hydrogen source and steam in the contacting zone; producing a total product and a used inorganic salt catalyst; heating the used inorganic salt catalyst to remove at least a portion of contaminants from the inorganic salt catalyst, wherein a combustion gas is produced during the heating of the used inorganic salt catalyst; and recovering inorganic salts from the combustion gas.

In certain embodiments, the invention provides a method of producing total product, comprising: providing a feed to a contacting zone; providing an inorganic salt catalyst to the contacting zone; contacting the inorganic salt catalyst with the feed in the presence of a hydrogen source and steam such that the inorganic salt catalyst becomes fluidized in the contacting zone; and producing a total product.

In certain embodiments, the invention provides a method of producing a total product, comprising: providing a feed to a contacting zone; providing a supported inorganic salt catalyst to the contacting zone; contacting the supported inorganic salt catalyst with the feed in the presence of a hydrogen source and steam in the contacting zone; and producing the total product.

In certain embodiments, the invention provides a method of producing a crude product, comprising: providing a feed to a contacting zone, wherein the feed has at total content, per gram of feed, of at least 0.9 grams of hydrocarbons having a boiling range distribution between 343° C. and 538° C.; providing a supported inorganic salt catalyst to the contacting zone; contacting the supported inorganic salt catalyst with the feed in the presence of a hydrogen source and steam such that the supported inorganic salt catalyst becomes fluidized; and producing a total product that includes a crude product, and the crude product having a total content of at least 0.2 grams per gram of crude product of hydrocarbon have a boiling range distribution between 204° C. and 343° C.

In certain embodiments, the invention provides a method of producing a total product, comprising: contacting a feed with a hydrogen source in the presence of one or more inorganic salt catalysts and steam to produce a total product; and controlling contacting conditions such that the conversion of feed to hydrocarbon gas and hydrocarbon liquid is between 5% and 50%, based on the molar amount of carbon in the feed.

In certain embodiments, the invention provides a method of producing a total product, comprising: contacting a feed with light hydrocarbons in the presence of one or more inorganic salt catalysts and steam to produce a total product; and controlling contacting conditions such that at least 50% of the light hydrocarbons are recovered; and producing a total product, wherein a ratio of atomic hydrogen to carbon (H/C) in the total product is between 80% and 120% of the atomic H/C of the feed.

In certain embodiments, the invention provides a method of producing a total product, comprising: providing a feed to a contacting zone; providing a supported inorganic salt catalyst to the contacting zone; contacting the supported inorganic salt catalyst with the feed in the presence of a hydrogen source and steam in the contacting zone at a temperature of at most 1000° C. and a total operating pressure of at most 4 MPa; and producing the total product.

In certain embodiments, the invention provides a method of producing a total product, comprising: continuously contacting a feed with a hydrogen source in the presence of one or more inorganic salt catalysts and steam to produce a total product, wherein the feed has at least 0.02 grams of sulfur, per gram of feed; and producing a total product that includes that includes coke and the crude product, wherein the crude product has a sulfur content of at most 90% of the sulfur content of the feed and the content of coke is at most 0.2 grams, per gram of feed.

In further embodiments, features from specific embodiments may be combined with features from other embodiments. For example, features from the any one of the series of embodiments may be combined with features from any of the other series of embodiments.

In further embodiments, total products are obtainable by any of the methods and systems described herein.

In further embodiments, additional features may be added to the specific embodiments described herein.

BRIEF DESCRIPTION OF THE DRAWINGS

Advantages of the present invention will become apparent to those skilled in the art with the benefit of the following detailed description and upon reference to the accompanying drawings in which:

FIG. 8 is a schematic of an embodiment of multiple contacting systems.

FIG. 10 is a graphical representation of log 10 plots of ion currents of emitted gases of an inorganic salt catalyst versus temperature, as determined by TAP.

FIG. 16 is a graphical representation of product selectivity versus calcium oxide, magnesium oxide, zirconium oxide, and silicon carbide.

Figure 1:
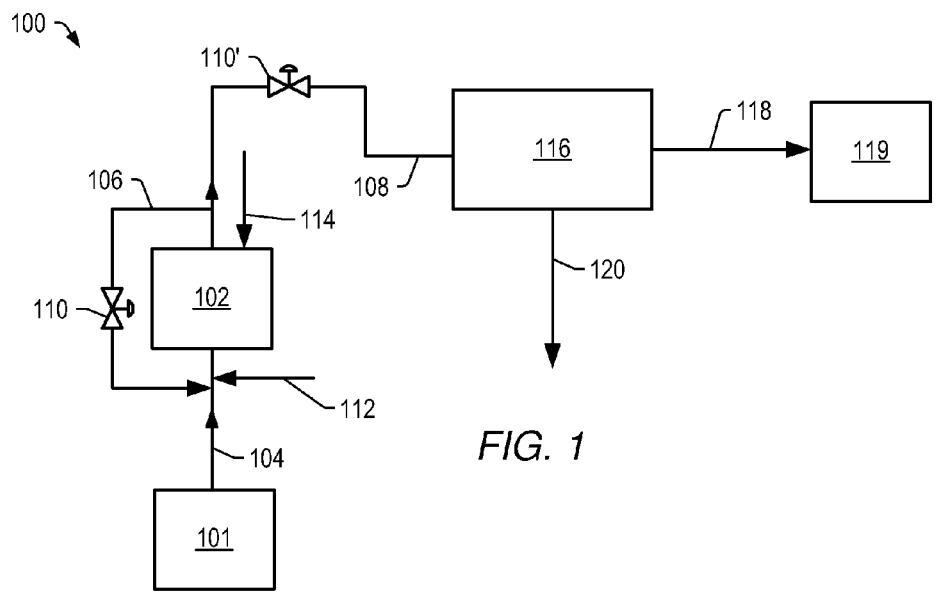
FIG. 1 is a schematic of an embodiment of a contacting system for contacting the feed with a hydrogen source in the presence of one or more catalysts to produce the total product.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but on the contrary, the intention is to cover all modifications, equivalents, and alternatives falling within the spirit and scope of the present invention.

DETAILED DESCRIPTION OF THE INVENTION

The above problems may be addressed using systems, methods, and catalysts described herein. For example, a feed and an inorganic salt catalyst may be provided to a contacting zone. Contact of the inorganic salt catalyst with the feed may be performed such that the inorganic salt catalyst becomes fluidized in the contacting zone and a total product is produced.

Certain embodiments of the inventions are described herein in more detail. Terms used herein are defined as follows.

"Alkali metal(s)" refer to one or more metals from Column 1 of the Periodic Table, one or more compounds of one or more metals from Column 1 of the Periodic Table, or mixtures thereof.

"Alkaline-earth metal(s)" refer to one or more metals from Column 2 of the Periodic Table, one or more compounds of one or more metals from Column 2 of the Periodic Table, or mixtures thereof.

"AMU" refers to atomic mass unit.

"ASTM" refers to American Standard Testing and Materials.

"Asphaltenes" refers to organic materials that are found in crudes that are not soluble in straight-chain hydrocarbons such as n-pentane or n-heptane. Asphaltene, in some embodiments, include aromatic and naphthenic ring compounds containing heteroatoms.

Atomic hydrogen percentage and atomic carbon percentage of feed, crude product, naphtha, kerosene, diesel, and VGO are as determined by ASTM Method D5291.

"API gravity" refers to API gravity at 15.5° C. API gravity is as determined by ASTM Method D6822.

"Bitumen" refers to one type of crude produced and/or retorted from a hydrocarbon formation.

Boiling range distributions for the feed and/or total product are as determined by ASTM Methods D5307, unless otherwise mentioned. Content of hydrocarbon components, for example, paraffins, iso-paraffins, olefins, naphthenes and aromatics in naphtha are as determined by ASTM Method D6730. Content of aromatics in diesel and VGO is as determined by IP Method 368/90. Content of aromatics in kerosene is as determined by ASTM Method D5186.

"Brønsted-Lowry acid" refers to a molecular entity with the ability to donate a proton to another molecular entity.

"Brønsted-Lowry base" refers to a molecular entity that is capable of accepting protons from another molecular entity. Examples of Brønsted-Lowry bases include hydroxide ($OH^-$), water ($H_2O$), carboxylate ($RCO_2^-$), halide ($Br^-$, $Cl^-$, $F^-$, $I^-$), bisulfate ($HSO_4^-$), and sulfate ($SO_4^{2-}$).

"Catalyst" refers to one or more supported catalysts, one or more unsupported catalysts, or mixtures thereof.

"Carbon number" refers to the total number of carbon atoms in a molecule.

"Coke" refers to solids containing carbonaceous solids that are not vaporized under process conditions. The content of coke is as determined by mass balance. The weight of coke is the total weight of solid minus the total weight of input catalysts.

"Content" refers to the weight of a component in a substrate (for example, a crude, a total product, or a crude product) expressed as weight fraction or weight percentage based on the total weight of the substrate. "Wtppm" refers to parts per million by weight.

"Diesel" refers to hydrocarbons with a boiling range distribution between 260° C. and 343° C. (500-650° F.) at 0.101 MPa. Diesel content is as determined by ASTM Method D2887.

"Distillate" refers to hydrocarbons with a boiling range distribution between 204° C. and 343° C. (400-650° F.) at 0.101 MPa. Distillate content is as determined by ASTM Method D2887. Distillate may include kerosene and diesel.

"DSC" refers to differential scanning calorimetry.

"Feed" refers to a crude, disadvantaged crude, a mixture of hydrocarbons, or combinations thereof that are to be treated as described herein.

"Freeze point" and "freezing point" refer to the temperature at which formation of crystalline particles occurs in a liquid. A freezing point is as determined by ASTM D2386.

"GC/MS" refers to gas chromatography in combination with mass spectrometry.

"Hard base" refers to anions as described by Pearson in *Journal of American Chemical Society,* 1963, 85, p. 3533, which is incorporated by reference herein.

"H/C" refers to a weight ratio of atomic hydrogen to atomic carbon. H/C is as determined from the values measured for weight percentage of hydrogen and weight percentage of carbon by ASTM Method D5291.

"Heteroatoms" refer to oxygen, nitrogen, and/or sulfur contained in the molecular structure of a hydrocarbon. Heteroatoms content is as determined by ASTM Methods E385 for oxygen, D5762 for nitrogen, and D4294 for sulfur.

"Hydrogen source" refers to hydrogen, and/or a compound and/or compounds when in the presence of a feed and the catalyst react to provide hydrogen to one or more compounds in the feed. A hydrogen source may include, but is not limited to, hydrocarbons (for example, $C_1$ to $C_6$ hydrocarbons such as methane, ethane, propane, butane, pentane, naphtha), water, or mixtures thereof. A mass balance is conducted to assess the net amount of hydrogen provided to one or more compounds in the feed.

"Inorganic salt" refers to a compound that is composed of a metal cation and an anion.

"IP" refers to the Institute of Petroleum, now the Energy Institute of London, United Kingdom.

"Iso-paraffins" refer to branched-chain saturated hydrocarbons.

"Kerosene" refers to hydrocarbons with a boiling range distribution between about 204° C. and about 260° C. (400-500° F.) at 0.101 MPa. Kerosene content is as determined by ASTM Method D2887.

"Lewis acid" refers to a compound or a material with the ability to accept one or more electrons from another compound.

"Lewis base" refers to a compound and/or material with the ability to donate one or more electrons to another compound.

"Light Hydrocarbons" refer to hydrocarbons having carbon numbers in a range from 1 to 6.

"Liquid mixture" refers to a composition that includes one or more compounds that are liquid at standard temperature and pressure (25° C., 0.101 MPa, hereinafter referred to as "STP"), or a composition that includes a combination of one or more compounds that are liquid at STP with one or more compounds that are solid at STP.

"Micro-Carbon Residue" ("MCR") refers to a quantity of carbon residue remaining after evaporation and pyrolysis of a substance. MCR content is as determined by ASTM Method D4530.

"Naphtha" refers to hydrocarbon components with a boiling range distribution between 38° C. and 204° C. (100-400° F.) at 0.101 MPa. Naphtha content is as determined by ASTM Method D2887.

"Ni/V/Fe" refers to nickel, vanadium, iron, or combinations thereof.

"Ni/V/Fe content" refers to Ni/V/Fe content in a substrate. Ni/V/Fe content is as determined by ASTM Method D5863.

"$Nm^3/m^3$" refers to normal cubic meters of gas per cubic meter of feed.

"Nonacidic" refers to Lewis base and/or Brønsted-Lowry base properties.

"Non-condensable gas" refers to components and/or a mixture of components that are gases at standard temperature and pressure (25° C., 0.101 MPa, hereinafter referred to as "STP").

"n-Paraffins" refer to normal (straight chain) saturated hydrocarbons.

"Octane number" refers to a calculated numerical representation of the antiknock properties of a motor fuel compared to a standard reference fuel. A calculated octane number of naphtha is as determined by ASTM Method D6730.

"Olefins" refer to compounds with non-aromatic carbon-carbon double bonds. Types of olefins include, but are not limited to, cis, trans, terminal, internal, branched, and linear.

"Periodic Table" refers to the Periodic Table as specified by the International Union of Pure and Applied Chemistry (IUPAC), November 2003.

"Polyaromatic compounds" refer to compounds that include two or more aromatic rings. Examples of polyaromatic compounds include, but are not limited to, indene, naphthalene, anthracene, phenanthrene, benzothiophene, and dibenzothiophene.

"Residue" refers to components that have a boiling range distribution above 538° C. (1000° F.) at 0.101 MPa, as determined by ASTM Method D5307.

"Semiliquid" refers to a phase of a substance that has properties of a liquid phase and a solid phase of the substance. Examples of semiliquid inorganic salt catalysts include a slurry and/or a phase that has a consistency of, for example, taffy, dough, or toothpaste.

"SCFB" refers to standard cubic feet of gas per barrel of feed.

"Spent hydroprocessing catalyst" refers to any catalyst that is no longer considered acceptable for use in a hydrotreating and/or a hydrocracking catalytic process. Spent hydroprocessing catalysts include, but are not limited to, nickel sulfide, vanadium sulfide, and/or molybdenum sulfide.

"Superbase" refers to a material that can deprotonate hydrocarbons such as paraffins and olefins under reaction conditions.

"TAN" refers to a total acid number expressed as milligrams ("mg") of KOH per gram ("g") of sample. TAN is as determined by ASTM Method D664.

"TAP" refers to temporal-analysis-of-products.

"VGO" refers to components with a boiling range distribution between about 343° C. and about 538° C. (650-1000° F.) at 0.101 MPa. VGO content is as determined by ASTM Method D2887.

"WHSV" refers to a weight of feed/unit time divided by a volume of catalyst expressed as $hours^{-1}$.

All referenced methods are incorporated herein by reference. In the context of this application, it is to be understood that if the value obtained for a property of the composition tested is outside of the limits of the test method, the test method may be recalibrated to test for such property. It should be understood that other standardized testing methods that are considered equivalent to the referenced testing methods may be used.

Crudes may be produced and/or retorted from hydrocarbon containing formations and then stabilized. Crudes are generally solid, semi-solid, and/or liquid. Crudes may include crude oil. Stabilization may include, but is not limited to, removal of non-condensable gases, water, salts, or combinations thereof, from the crude to form a stabilized crude. Such stabilization may often occur at, or proximate to, the production and/or retorting site.

Stabilized crudes typically have not been distilled and/or fractionally distilled in a treatment facility to produce multiple components with specific boiling range distributions (for example, naphtha, distillates, VGO, and/or lubricating oils). Distillation includes, but is not limited to, atmospheric distillation methods and/or vacuum distillation methods. Undistilled and/or unfractionated stabilized crudes may include components that have a carbon number above 4 in quantities of at least 0.5 grams of components per gram of crude. Examples of stabilized crudes include whole crudes, topped crudes, desalted crudes, desalted topped crudes, or combinations thereof. "Topped" refers to a crude that has been treated such that at least some of the components that have a boiling point below 35° C. at 0.101 MPa are removed. Typically, topped crudes have a content of at most 0.1 grams, at most 0.05 grams, or at most 0.02 grams of such components per gram of the topped crude.

Some stabilized crudes have properties that allow the stabilized crudes to be transported to conventional treatment facilities by transportation carriers (for example, pipelines, trucks, or ships). Other crudes have one or more unsuitable properties that render them disadvantaged. Disadvantaged crudes may be unacceptable to a transportation carrier, and/or a treatment facility, thus imparting a low economic value to the disadvantaged crude. The economic value may be such that a reservoir that includes the disadvantaged crude that is deemed too costly to produce, transport, and/or treat.

Properties of disadvantaged crudes may include, but are not limited to: a) TAN of at least 0.5; b) viscosity of at least about 0.2 Pa·s; c) API gravity of at most 19; d) a total Ni/V/Fe content of at least 0.00005 grams or at least 0.0001 grams of Ni/V/Fe per gram of crude; e) a total heteroatoms content of at least 0.005 grams of heteroatoms per gram of crude; f) a residue content of at least 0.01 grams of residue per gram of crude; g) an asphaltenes content of at least 0.04 grams of asphaltenes per gram of crude; h) a MCR content of at least 0.02 grams of MCR per gram of crude; or i) combinations thereof. In some embodiments, disadvantaged crude may include, per gram of disadvantaged crude, at least 0.2 grams of residue, at least 0.3 grams of residue, at least 0.5 grams of residue, or at least 0.9 grams of residue. In certain embodiments, disadvantaged crude has about 0.2-0.99 grams, about 0.3-0.9 grams, or about 0.4-0.7 grams of residue per gram of disadvantaged crude. In certain embodiments, disadvantaged crudes, per gram of disadvantaged crude, may have a sulfur content of at least 0.001 grams, at least 0.005 grams, at least 0.01 grams, at least 0.02 grams, at least 0.03 grams, or at least 0.04 grams. In some embodiments, disadvantaged crudes may have a nitrogen content of at least 0.001 grams, at least 0.005 grams, at least 0.01 grams, or at least 0.02 grams per gram of disadvantaged crude.

Disadvantaged crudes may include a mixture of hydrocarbons having a range of boiling points. Disadvantaged crudes may include, per gram of disadvantaged crude: at least 0.001 grams, at least 0.005 grams, or at least 0.01 grams of hydrocarbons with a boiling range distribution between about 200° C. and about 300° C. at 0.101 MPa; at least 0.001 grams, at least 0.005 grams, or at least 0.01 grams of hydrocarbons with a boiling range distribution between about 300° C. and about 400° C. at 0.101 MPa; and at least 0.001 grams, at least 0.005 grams, or at least 0.01 grams of hydrocarbons with a boiling range distribution between about 400° C. and about 700° C. at 0.101 MPa, or combinations thereof.

In some embodiments, disadvantaged crudes may also include, per gram of disadvantaged crude, at least 0.001 grams, at least 0.005 grams, or at least 0.01 grams of hydrocarbons with a boiling range distribution of at most 200° C. at 0.101 MPa in addition to higher boiling components. Typically, the disadvantaged crude has, per gram of disadvantaged crude, a content of such hydrocarbons of at most 0.2 grams, or at most 0.1 grams.

In certain embodiments, disadvantaged crudes may include, per gram of disadvantaged crude, up to 0.9 grams, or up to 0.99 grams of hydrocarbons with a boiling range distribution of at least 300° C. In certain embodiments, disadvantaged crudes may also include, per gram of disadvantaged crude, at least 0.001 grams of hydrocarbons with a boiling range distribution of at least 650° C. In certain embodiments, disadvantaged crudes may include, per gram of disadvantaged crude, up to about 0.9 grams, or up to about 0.99 grams of hydrocarbons with a boiling range distribution between about 300° C. and about 1000° C. In some embodiments, disadvantaged crudes include at least 0.1 grams, at least 0.5 grams, at least 0.8 grams, or at least 0.99 grams of asphaltenes per gram of disadvantaged crude. Disadvantaged crudes may include from about 0.01 grams to about 0.99 grams, from about 0.1 grams to about 0.9 grams, or from about 0.5 grams to about 0.8 grams of asphaltenes per gram of disadvantage crude. Examples of disadvantaged crudes that can be treated using the processes described herein include, but are not limited to, crudes from the following countries and regions of those countries: Canadian Alberta, Venezuelan Orinoco, U.S. southern Californian and north slope Alaska, Mexico Bay of Campeche, Argentinean San Jorge basin, Brazilian Santos and Campos basins, China Bohai Gulf, China Karamay, Iraq Zagros, Kazakhstan Caspian, Nigeria Offshore, United Kingdom North Sea, Madagascar northwest, Oman, and Netherlands Schoonebek.

Treatment of disadvantaged crudes may enhance the properties of the disadvantaged crudes such that the crudes are acceptable for transportation and/or treatment. The feed may be topped as described herein. The crude product resulting from treatment of the feed, using methods described herein is suitable for transporting and/or refining. Properties of the crude product are closer to the corresponding properties of West Texas Intermediate crude than the feed, or closer to the corresponding properties of Brent crude than the feed, and thereby have enhanced economic value relative to the economic value of the feed. Such crude product may be refined with less or no pre-treatment, thereby enhancing refining efficiencies. Pre-treatment may include desulfurization, demetallization, and/or atmospheric distillation to remove impurities from the crude product.

Methods of contacting a feed in accordance with inventions are described herein. Additionally, embodiments to produce products with various concentrations of naphtha, kerosene, diesel, and/or VGO, which are not generally produced in conventional types of processes, are described.

In some embodiments, feeds that have boiling point distributions from about 10° C. to 1200° C. (for example, asphaltenes, VGO, kerosene, diesel, naphtha, or mixtures thereof) may be contacted in accordance with the systems, methods and catalysts described herein. The feed may include, per gram of feed, at least 0.01 grams, at least 0.1 grams, at least 0.5 grams or at least 0.9 grams of a mixture of hydrocarbons having boiling point distributions with an initial boiling point above 538° C. In some embodiments, the feed may include, per gram of feed, from about 0.01 grams to about 0.9 grams, from about 0.1 grams to about 0.8 grams, from about 0.5 grams to about 0.7 grams of a mixture of hydrocarbons having boiling point distributions with an initial boiling point above 538° C.

Hydrocarbon mixtures that have at least 0.01 grams, at least 0.1 grams, at least 0.5 grams, at least 0.8 grams, or at least 0.99 grams of VGO per gram of hydrocarbon mixture, may be treated in accordance with the system and methods described herein to produce various amounts of naphtha, kerosene, diesel, or distillate. A hydrocarbon mixture having, per gram of hydrocarbon mixture, from about 0.01 grams to about 0.99 grams, from about 0.05 grams to about 0.9 grams, from about 0.1 grams to about 0.8 grams, from about 0.2 grams to about 0.7 grams, or from about 0.3 grams to about 0.6 grams of VGO may be treated to produce various products having a boiling point distribution lower than the boiling point distribution of VGO.

The feed may be contacted with a hydrogen source in the presence of one or more of the catalysts in a contacting zone and/or in combinations of two or more contacting zones.

In some embodiments, the hydrogen source is generated in situ. In situ generation of the hydrogen source may include the reaction of at least a portion of the feed with the inorganic salt catalyst at temperatures in a range from about 200-1200° C., about 300-1000° C., about 400-900° C., or about 500-800° C. to form hydrogen and/or light hydrocarbons. In situ generation of hydrogen may include the reaction of at least a portion of the inorganic salt catalyst that includes, for example, alkali metal formate.

The total product generally includes gas, vapor, liquids, or mixtures thereof produced during the contacting. The total product includes the crude product that is a liquid mixture at STP and, in some embodiments, hydrocarbons that are not condensable at STP. In some embodiments, the total product and/or the crude product may include solids (such as inorganic solids and/or coke). In certain embodiments, the solids may be entrained in the liquid and/or vapor produced during contacting.

A contacting zone typically includes a reactor, a portion of a reactor, multiple portions of a reactor, or multiple reactors. Examples of reactors that may be used to contact a feed with a hydrogen source in the presence of catalyst include a stacked bed reactor, a fixed bed reactor, a continuously stirred tank reactor (CSTR), a spray reactor, a plug-flow reactor, and a liquid/liquid contactor. Examples of a CSTR include a fluidized bed reactor and an ebullating bed reactor.

Contacting conditions typically include temperature, pressure, feed flow, total product flow, residence time, hydrogen source flow, or combinations thereof. Contacting conditions may be controlled to produce a crude product with specified properties.

Contacting temperatures may range from about 200-800° C., about 300-700° C., or about 400-600° C. In embodiments in which the hydrogen source is supplied as a gas (for example, hydrogen gas, methane, or ethane), a ratio of the gas to the feed will generally range from about 1-16,100 $Nm^3/m^3$, about 2-8000 $Nm^3/m^3$, about 3-4000 $Nm^3/m^3$, or about 5-320 $Nm^3/m^3$. Contacting typically takes place in a pressure range between about 0.1-20 MPa, about 1-16 MPa, about 2-10 MPa, or about 4-8 MPa. In some embodiments in which steam is added, a ratio of steam to feed is in a range from about 0.01-10 kilograms, about 0.03-5 kilograms, or about 0.1-1 kilogram of steam, per kilogram of feed. A flow rate of feed may be sufficient to maintain the volume of feed in the contacting zone of at least 10%, at least 50%, or at least 90% of the total volume of the contacting zone. Typically, the volume of feed in the contacting zone is about 40%, about 60%, or about 80% of the total volume of the contacting zone. In some embodiments, WHSV in a contacting zone ranges from about 0.1 to about 30 $h^{-1}$, about 0.5 to about 20 $h^{-1}$, or about 1 to about $10^{-1}$. In some embodiments, contacting may be done in the presence of an additional gas, for example, argon, nitrogen, methane, ethane, propanes, butanes, propenes, butenes, or combinations thereof.

FIG. 1 is a schematic of an embodiment of contacting system 100 used to produce the total product as a vapor. The feed exits feed supply 101 and enters contacting zone 102 via conduit 104. A quantity of the catalyst used in the contacting zone may range from about 1 gram to 1000 grams, about 2 grams to 500 grams, about 3 grams to 200 grams, about 4 grams to 100 grams, about 5 grams to 50 grams, about 6 grams to 80 grams, about 7 grams to 70 grams, or about 8 grams to 60 grams, per 100 grams of feed in the contacting zone. In some embodiments, contacting zone 102 includes one or more fluidized bed reactors, one or more fixed bed reactors, or combinations thereof.

In certain embodiments, a diluent may be added to the feed to lower the viscosity of the feed. In some embodiments, the feed enters a bottom portion of contacting zone 102 via conduit 104. In certain embodiments, the feed may be heated to a temperature of at least 100° C. or at least 300° C. prior to and/or during introduction of the feed to contacting zone 102. Typically, the feed may be heated to a temperature in a range from about 100-500° C. or about 200-400° C.

In some embodiments, the catalyst is combined with the feed and transferred to contacting zone 102. The feed/catalyst mixture may be heated to a temperature of at least 100° C. or at least 300° C. prior to introduction into contacting zone 102. Typically, the feed may be heated to a temperature in a range from about 200-500° C. or about 300-400° C. In some embodiments, the feed/catalyst mixture is a slurry. In certain embodiments, TAN of the feed may be reduced prior to introduction of the feed into the contacting zone. For example, when the feed/catalyst mixture is heated at a temperature in a range from about 100-400° C. or about 200-300° C., alkali salts of acidic components in the feed may be formed. The formation of these alkali salts may remove some acidic components from the feed to reduce the TAN of the feed.

In some embodiments, the feed is added continuously to contacting zone 102. Mixing in contacting zone 102 may be sufficient to inhibit separation of the catalyst from the feed/catalyst mixture. In certain embodiments, at least a portion of the catalyst may be removed from contacting zone 102, and in some embodiments, such catalyst is regenerated and re-used. In certain embodiments, fresh catalyst may be added to contacting zone 102 during the reaction process.

In some embodiments, the feed and/or a mixture of feed with the inorganic salt catalyst is introduced into the contacting zone as an emulsion. The emulsion may be prepared by combining an inorganic salt catalyst/water mixture with a feed/surfactant mixture. In some embodiments, a stabilizer is added to the emulsion. The emulsion may remain stable for at least 2 days, at least 4 days, or at least 7 days. Typically, the emulsion may remain stable for 30 days, 10 days, 5 days, or 3 days. Surfactants include, but are not limited to, organic polycarboxylic acids (Tenax 2010; MeadWestvaco Specialty Product Group; Charleston, S.C., U.S.A.), $C_{21}$ dicarboxylic fatty acid (DIACID 1550; MeadWestvaco Specialty Product Group), petroleum sulfonates (Hostapur SAS 30; Clarient Corporation, Charlotte, N.C., U.S.A.), Tergital NP-40 Surfactant (Union Carbide; Danbury, Conn., U.S.A.), or mixtures thereof. Stabilizers include, but are not limited to, diethyleneamine (Aldrich Chemical Co.; Milwaukee, Wis., U.S.A.) and/or monoethanolamine (J. T. Baker; Phillipsburg, N.J., U.S.A.).

Recycle conduit 106 may couple conduit 108 and conduit 104. In some embodiments, recycle conduit 106 may directly enter and/or exit contacting zone 102. Recycle conduit 106 may include flow control valve 110. Flow control valve 110 may allow at least a portion of the material from conduit 108 to be recycled to conduit 104 and/or contacting zone 102. In some embodiments, a condensing unit may be positioned in conduit 108 to allow at least a portion of the material to be condensed and recycled to contacting zone 102. In certain embodiments, recycle conduit 106 may be a gas recycle line. Flow control valves 110 and 110' may be used to control flow to and from contacting zone 102 such that a constant volume of liquid in the contacting zone is maintained. In some embodiments, a substantially selected volume range of liquid can be maintained in the contacting zone 102. A volume of feed in contacting zone 102 may be monitored using standard instrumentation. Gas inlet port 112 may be used to allow addition of the hydrogen source and/or additional gases to the feed as the feed enters contacting zone 102. In some embodiments, steam inlet port 114 may be used to allow addition of steam to contacting zone 102. In certain embodiments, an aqueous stream is introduced into contacting zone 102 through steam inlet port 114.

In some embodiments, at least a portion of the total product is produced as vapor from contacting zone 102. In certain embodiments, the total product is produced as vapor and/or a vapor containing small amounts of liquids and solids from the top of contacting zone 102. The vapor is transported to separation zone 116 via conduit 108. The ratio of a hydrogen source to feed in contacting zone 102 and/or the pressure in the contacting zone may be changed to control the vapor and/or liquid phase produced from the top of contacting zone 102. In some embodiments, the vapor produced from the top of contacting zone 102 includes at least 0.5 grams, at least 0.8 grams, at least 0.9 grams, or at least 0.97 grams of crude product per gram of feed. In certain embodiments, the vapor produced from the top of contacting zone 102 includes from about 0.8-0.99 grams, or about 0.9-0.98 grams of crude product per gram of feed.

Used catalyst and/or solids may remain in contacting zone 102 as by-products of the contacting process. The solids and/or used catalyst may include residual feed and/or coke.

In separation unit 116, the vapor is cooled and separated to form the crude product and gases using standard separation techniques. The crude product exits separation unit 116 and enters crude product receiver 119 via conduit 118. The resulting crude product may be suitable for transportation and/or treatment. Crude product receiver 119 may include one or more pipelines, one or more storage units, one or more transportation vessels, or combinations thereof. In some embodiments, the separated gas (for example, hydrogen, carbon monoxide, carbon dioxide, hydrogen sulfide, or methane) is transported to other processing units (for example, for use in a fuel cell or a sulfur recovery plant) and/or recycled to contacting zone 102 via conduit 120. In certain embodiments, entrained solids and/or liquids in the crude product may be removed using standard physical separation methods (for example, filtration, centrifugation, or membrane separation).

Figure 2:
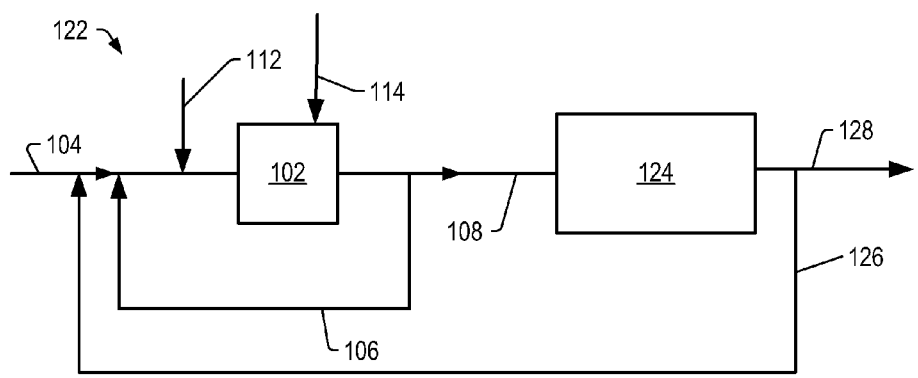
FIG. 2 is a schematic of another embodiment of a contacting system for contacting the feed with a hydrogen source in the presence of one or more catalysts to produce the total product.

FIG. 2 depicts contacting system 122 for treating feed with one or more catalysts to produce a total product that may be a liquid, or a liquid mixed with gas or solids. The feed may enter contacting zone 102 as described herein via conduit 104. In some embodiments, the feed is received from the feed supply. Conduit 104 may include gas inlet port 112. In some embodiments, gas inlet port 112 may directly enter contacting zone 102. In certain embodiments, steam inlet port 114 may be used to allow addition of the steam to contacting zone 102. The feed may be contacted with the catalyst in contacting zone 102 to produce a total product.

In some embodiments, conduit 106 allows at least a portion of the total product to be recycled to contacting zone 102. A mixture that includes the total product and/or solids and/or unreacted feed exits contacting zone 102 and enters separation zone 124 via conduit 108. In some embodiments, a condensing unit may be positioned (for example, in conduit 106) to allow at least a portion of the mixture in the conduit to be condensed and recycled to contacting zone 102 for further processing. In certain embodiments, recycle conduit 106 may be a gas recycle line. In some embodiments, conduit 108 may include a filter for removing particles from the total product.

In separation zone 124, at least a portion of the crude product may be separated from the total product and/or catalyst. In embodiments in which the total product includes solids, the solids may be separated from the total product using standard solid separation techniques (for example, centrifugation, filtration, decantation, membrane separation). Solids include, for example, a combination of catalyst, used catalyst, and/or coke. In some embodiments, a portion of the gases is separated from the total product. In some embodiments, at least a portion of the total product and/or solids may be recycled to conduit 104 and/or, in some embodiments, to contacting zone 102 via conduit 126. The recycled portion may, for example, be combined with the feed and enter contacting zone 102 for further processing. The crude product may exit separation zone 124 via conduit 128. In certain embodiments, the crude product may be transported to the crude product receiver.

In some embodiments, contact of a catalyst with gas and a feed may be performed under fluidization conditions. Fluidization of the catalyst may allow operation of the reaction to be preformed at less stringent conditions. For example, fluidization of the catalyst may lower the total amount of heat required to produce the total product, thus the contacting zone may be operated at reduced temperatures and pressures relative to a slurry or fixed bed process. For example, catalytic cracking and steam reformation processes may be performed at temperatures of at most 1000° C., at most 900° C., at most 800° C., at most 700° C., or at most 600° C. and at pressures of at most 4 MPa, at most 3.5 MPa, at most, 3 MPa, or at most 2 MPa when using a supported inorganic salt catalyst in a fluidized catalyst contacting zone. Fluidization of the catalyst may also allow an increased surface area of contact for the feed with the catalyst. An increased surface area of contact may lead to increased conversion of feed to total products. Additionally, coke production may be minimized at elevated temperatures when the process is conducted under fluidization conditions (for example, at temperatures of at least 500° C., at least 700° C., at least 800° C.). In some embodiments, an inorganic salt catalyst is a supported catalyst. Supported inorganic salt catalysts may be more readily fluidized than unsupported inorganic salt catalysts.

Figure 3:
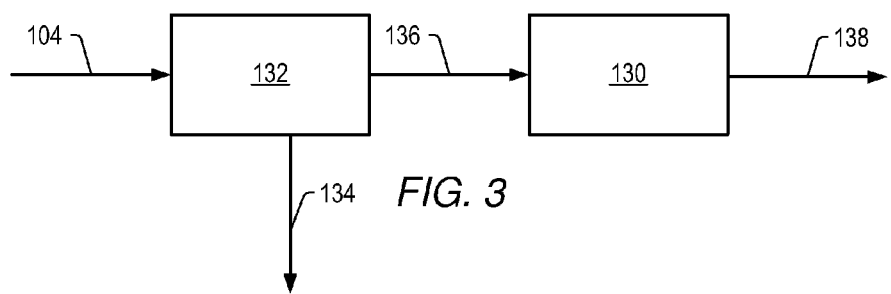
FIG. 3 is a schematic of an embodiment of a contacting system for fluidly contacting the feed with a hydrogen source in the presence of one or more catalyst to produce the total product.

FIG. 3 depicts contacting system 130 for treating a feed with one or more catalysts to produce a total product that may be gas and/or liquid. Contacting zone 102 may be a fluidized reactor. The feed may enter contacting zone 102 via conduit 104. The feed may be heated as previously described, emulsified, and/or mixed with catalyst as previously described. Conduit 104 may include gas inlet port 112 and steam inlet port 114. Steam inlet ports 114', 114" may directly enter contacting zone 102. In some embodiments, gas inlet port 112 may directly enter contacting zone 102. In certain embodiments, steam inlet ports 114' and 114" are not necessary. The catalyst may enter contacting zone via conduit 132. A quantity of the catalyst used in the contacting zone may range from about 1 gram to 1000 grams, about 2 grams to 500 grams, about 3 grams to 200 grams, about 4 grams to 100 grams, about 5 grams to 50 grams, about 6 grams to 80 grams, about 7 grams to 70 grams, or about 8 grams to 60 grams, per 100 grams of feed in the contacting zone. In some embodiments, the catalyst may enter contacting zone at various elevations of the contacting zone (for example, bottom elevation, middle elevation, and/or upper elevation). Conduit 106 allows at least a portion of the total product/feed mixture to be recycled.

The catalyst may be fluidized through the upward lift of gas and feed and/or recycled total product/feed mixture, which are distributed across the contacting zone through distributor 134 and a grid plate 136. Spent catalyst and/or a portion of the total product/feed mixture may exit contacting zone 102 via conduit 138. Pump 140 controls the flow of fluidized liquid obtained from internal vapor/liquid separator 142. The height of the fluidized bed is adjusted by varying the speed of pump 140 using methods known in the art.

In some embodiments, during contacting impurities (for example, coke, nitrogen containing compounds, sulfur containing compounds, and/or metals such as nickel and/or vanadium) form on the catalyst. Removal of the impurities in situ may enhance contacting run times as compared to ending the run and removing all the catalyst from the contacting zone. In situ removal of the impurities may be performed through combustion of the catalyst. In some embodiments, an oxygen source (for example, air and/or oxygen) may be introduced into contacting zone 102 to allow combustion of impurities on the catalyst to occur. An oxygen source may be added at a rate sufficient to from a combustion front, but the formed combustion front is inhibited from entering the headspace of contacting zone 102 (for example, oxygen may be added at a rate sufficient to maintain the total mole percent of oxygen in the head-space below 7 percent). Heat from the combustion process may lessen the requirement for heat from an external source to be added to contacting zone 102 during use.

Feed may be fluidly contacted with hydrogen in the presence of one or more catalysts in contacting zone 102 to produce a total product. Total product may exit contacting zone 102 via conduit 108 and enter separation zone 144. Separation zone may be similar, or the same as, previously described separation zones or separation zones know in the art. Total product may include crude product, gas, water, solids, catalyst, or combinations thereof. Temperatures in contacting zone 102 may range from about 300° C. to about 1000° C., about 400° C. to about 900° C., from about 500° C. to about 800° C., about 600° C. to about 700° C. or about 750° C.

In separation zone 144, the total product is separated to form crude product and/or gas. Crude product may exit separation zone 144 via conduit 146. Gas may exit separation zone 144 via conduit 148. The crude product and/or gas may be used as is or further processed. In some embodiments, separated catalyst may be regenerated and/or combined with fresh catalyst entering contacting zone 102.

Fluidly contacting the feed with a hydrogen source in the presence of one or more inorganic metal salt catalysts may be an endothermic process. In some embodiments, fluidly contacting a feed with the inorganic metal salt catalyst may be up to 4 times as endothermic as a conventional fluidized catalytic cracking process. To provide sufficient heat transfer, an external heat source may be used to supply heat to the contacting zone. The external heat supply may be a combustor, a catalyst regeneration zone, a power plant, or any source of heat known in the art.

Figure 4:
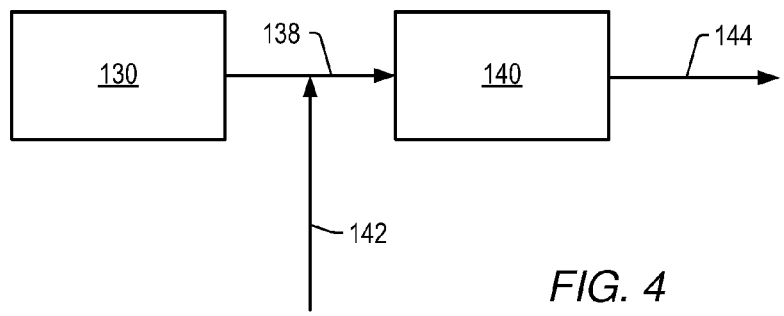
FIG. 4 is a schematic of another embodiment of a contacting system for fluidly contacting the feed with a hydrogen source in the presence of one or more catalyst to produce the total product.

FIG. 4 depicts contacting system 150. Contacting system 150 may be a fluidized catalytic cracking system and/or a modified fluidized catalytic cracking system. Contacting system 150 includes contacting zone 102, regeneration zone 152, and recovery zone 154. In some embodiments, contacting zone 102 and regeneration zone 152 are combined as one zone. Contacting zone 102 includes fluidizer 156 and internal separators 158, 158'. Feed enters contacting zone 102 via conduit 104. Catalyst enters contacting zone 102 via inlet port 160. A quantity of the catalyst used in the contacting zone may range from about 1-1000 grams, about 2-500 grams, about 3-200 grams, about 4-100 grams, about 5-50 grams, about 6-80 grams, about 7-70 grams, or about 8-60 grams, per 100 grams of feed in the contacting zone. Conduit 104 may include catalyst inlet port 160, gas inlet port 112, and steam inlet port 114. In some embodiments, steam, gas, and/or a hydrogen source may be mixed with the feed and catalyst prior to entering contacting zone 102.

In some embodiments, contacting zone 102 may include steam inlet port 114'. Steam inlet port 114' may allow additional steam or superheated steam to be added to the contacting zone. Heat from the steam may allow more controlled heating of the fluidizer 156. Fluidization of the feed and catalyst in fluidizer 156 may be performed using atomization nozzles, spray nozzles, pumps, and/or other fluidizing methods known in the art. In some embodiments, an oxygen source may be added to contacting zone 102 as described for contacting system 130.

Internal separators 158, 158' may separate a portion of the catalyst from the total product/feed mixture and recycle the total product/feed mixture to fluidizer 156. Separated catalyst may exit contacting zone 102 via conduit 162. Separated catalyst refers to used catalyst and/or a mixture of used catalyst and new catalyst. Used catalyst refers to catalyst that has been contacted with feed in the contacting zone.

Separated catalyst may enter regeneration zone 152 via conduit 166. Valve 164 may regulate flow of separated catalyst as it enters regeneration zone 152. An oxygen source may enter regeneration zone 152 via gas inlet port 168. At least a portion of the catalyst may be regenerated by removal of impurities from the catalyst through combustion. During combustion, combustion gas (flue gas) and regenerated catalyst are formed. Heat generated from the combustion process may be transferred to contacting zone 102. Transferred heat may range from about 500° C. to about 1000° C., from about 600° C. to about 900° C., or from about 700° C. to about 800° C.

At least a portion of regenerated catalyst may exit regeneration zone 152 via conduit 170. Valve 172 may be used to regulate flow of catalyst into conduit 104. In some embodiments, new catalyst and/or spent hydroprocessing catalyst is added to conduit 170 via conduit 174. New catalyst and/or spent hydroprocessing catalyst may be combined with regenerated catalyst in conduit 170. In some embodiments, the catalyst is added to conduit 170 and/or contacting zone 102 using a sprayer.

Combustion gas may exit regeneration zone 152 and enter recovery zone 154 via conduit 178. Combustion gas may include entrained inorganic salts of the catalyst. In some embodiments, the combustion gas may include catalyst particles, which may be removed using physical separation methods. In recovery zone 154, the combustion gas is separated from catalyst and/or the inorganic salts. In some embodiments, the combustion gas includes a fluidized bed with particles that may combine with the inorganic salts of the catalyst. The combined particle/inorganic salts may be separated from the combustion gas. The separated particle/inorganic salts may be used as and/or combined with the catalyst entering contacting zone 102.

In some embodiments, the combustion gas may be treated with water to partially dissolve inorganic salts entrained in the combustion gas to form an aqueous inorganic salt solution. The aqueous inorganic salt solution may be separated from the combustion gas using gas/liquid separation methods known in the art. The aqueous inorganic salt solution may be heated to remove the water to form an inorganic salt catalyst and/or recover the inorganic salts (for example, recover cesium, magnesium, calcium, and/or potassium salts). The recovered inorganic salts and/or formed catalyst may be used as and/or combined with the catalyst entering contacting zone 102. In some embodiments, the recovered inorganic salts may be sprayed into contacting zone 102 and/or conduit 174. In some embodiments, the recovered inorganic salts may be deposited on a catalyst support and the result supported inorganic salts may enter and/or be sprayed into contacting zone 102 and/or conduit 174.

Contact of the feed with a hydrogen source in the presence of one or more catalysts and steam in contacting system 150 produces a total product. The total product may exit from an upper elevation of contacting zone via conduit 108. The total product enters separation zone 144 and is separated into crude product and/or gas. Crude product may exit separation zone 144 via conduit 146. Gas may exit separation zone 144 via conduit 148. The crude product and/or gas may be used as is or further processed.

In some embodiments, the total product and/or crude product may include at least a portion of the catalyst. Gases entrained in the total product and/or crude product may be separated using standard gas/liquid separation techniques, for example, sparging, membrane separation, and pressure reduction. In some embodiments, the separated gas is transported to other processing units (for example, for use in a fuel cell, a sulfur recovery plant, other processing units, or combinations thereof) and/or recycled to the contacting zone.

Figure 5:
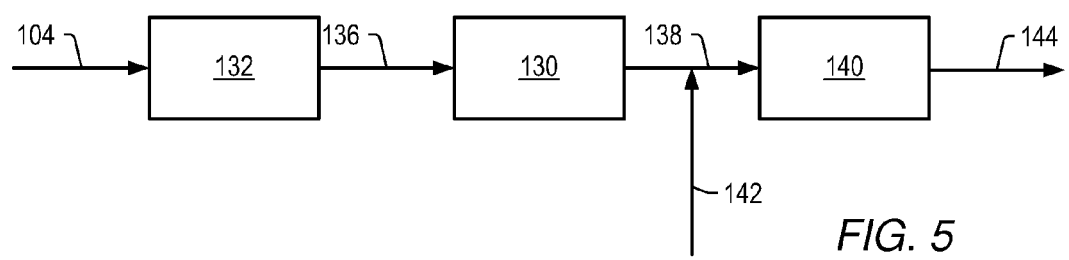
FIG. 5 is a schematic of an embodiment of a separation zone in combination with a contacting system.

In some embodiments, separation of at least a portion of a feed is performed before the feed enters the contacting zone. FIG. 5 is a schematic of an embodiment of a separation zone in combination with a contacting system. Contacting system 190 may be contacting system 100, contacting system 122, contacting system 130, contacting system 150, or combinations thereof (shown in FIGS. 1 through 4). The feed enters separation zone 192 via conduit 104. In separation zone 192, at least a portion of the feed is separated using standard separation techniques to produce a separated feed and hydrocarbons. The separated feed, in some embodiments, includes a mixture of components with a boiling range distribution of at least 100° C., at least 120° C. or, in some embodiments, a boiling range distribution of at least 200° C. Typically, the separated feed includes a mixture of components with a boiling range distribution between about 100-1000° C., about 120-900° C., or about 200-800° C. In some embodiments, the separated feed is VGO. The hydrocarbons separated from the feed exit separation zone 192 via conduit 194 to be transported to other processing units, treatment facilities, storage facilities, or combinations thereof.

At least a portion of the separated feed exits separation zone 192 and enters contacting system 190 via conduit 196 to be further processed to form the crude product, which exits contacting system 130 via conduit 198.

In some embodiments, the crude product produced from a feed by any method described herein is blended with a crude that is the same as or different from the feed. For example, the crude product may be combined with a crude having a different viscosity thereby resulting in a blended product having a viscosity that is between the viscosity of the crude product and the viscosity of the crude. The resulting blended product may be suitable for transportation and/or treatment.

Figure 6:
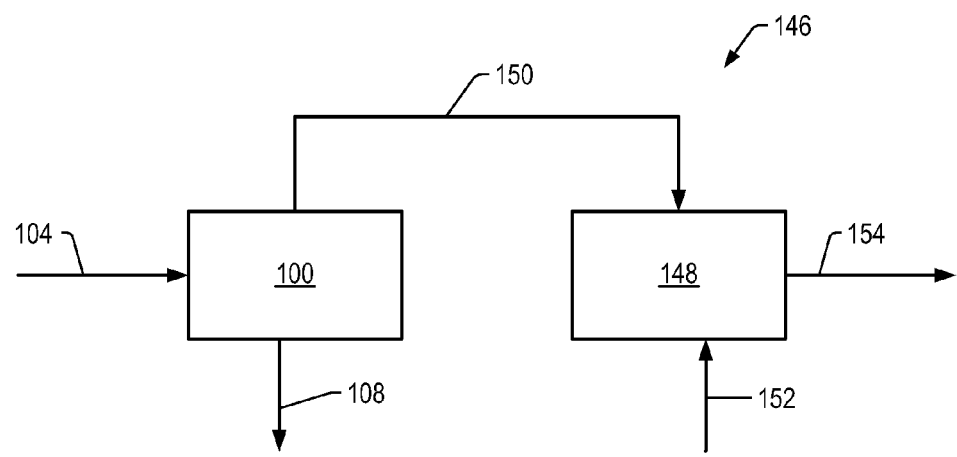
FIG. 6 is a schematic of an embodiment of a blending zone in combination with a contacting system.

FIG. 6 is a schematic of an embodiment of a combination of blending zone 200 and contacting system 190. In certain embodiments, at least a portion of the crude product exits contacting system 190 via conduit 198 and enters blending zone 200. In blending zone 200, at least a portion of the crude product is combined with one or more process streams (for example, a hydrocarbon stream produced from separation of one or more feeds, or naphtha), a crude, a feed, or mixtures thereof, to produce a blended product. The process streams, feed, crude, or mixtures thereof, are introduced directly into blending zone 200 or upstream of the blending zone via conduit 202. A mixing system may be located in or near blending zone 200. The blended product may meet specific product specifications. Specific product specifications include, but are not limited to, a range of or a limit of API gravity, TAN, viscosity, or combinations thereof. The blended product exits blending zone 200 via conduit 204 to be transported and/or processed.

In some embodiments, methanol is generated during the contacting process using the catalyst. For example, hydrogen and carbon monoxide may react to form methanol. The recovered methanol may contain dissolved salts, for example, potassium hydroxide. The recovered methanol may be combined with additional feed to form a feed/methanol mixture. Combining methanol with the feed tends to lower the viscosity of the feed. Heating the feed/methanol mixture to at most 500° C. may reduce TAN of the feed to less than 1.

Figures 7, 9:
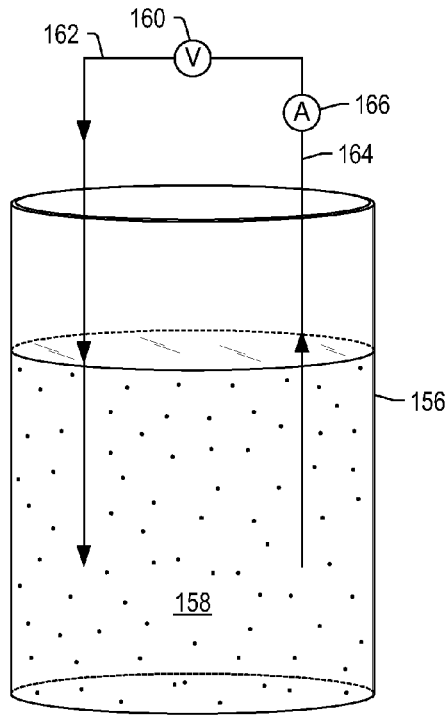
FIG. 7 is a schematic of an embodiment of a separation zone, a contacting system, and a blending zone.
FIG. 9 is a schematic of an embodiment of an ionic conductivity measurement system.

FIG. 7 is a schematic of an embodiment of a separation zone in combination with a contacting system in combination with a blending zone. The feed enters separation zone 192 through conduit 104. The feed is separated as previously described to form a separated feed. The separated feed enters contacting system 190 through conduit 196. The crude product exits contacting system 190 and enters blending zone 200 through conduit 198. In blending zone 200, other process stream and/or crudes introduced via conduit 202 are combined with the crude product to form a blended product. The blended product exits blending zone 200 via conduit 204.

FIG. 8 is a schematic of multiple contacting system 206. Contacting system 208 (for example, contacting systems shown in FIGS. 1 through 4) may be positioned before contacting system 210. In an alternate embodiment, the positions of the contacting systems can be reversed. Contacting system 208 includes an inorganic salt catalyst. Contacting system 210 may include one or more catalysts. The catalyst in contacting system 210 may be an additional inorganic salt catalyst and/or commercial catalysts. The feed enters contacting system 208 via conduit 104 and is contacted with a hydrogen source in the presence of the inorganic salt catalyst to produce the total product. The total product includes hydrogen and, in some embodiments, a crude product. The total product may exit contacting system 208 via conduit 108. The hydrogen generated from contact of the inorganic salt catalyst with the feed may be used as a hydrogen source for contacting system 210. At least a portion of the generated hydrogen is transferred to contacting system 210 from contacting system 208 via conduit 212.

In an alternate embodiment, such generated hydrogen may be separated and/or treated, and then transferred to contacting system 210 via conduit 212. In certain embodiments, contacting system 210 may be a part of contacting system 208 such that the generated hydrogen flows directly from contacting system 208 to contacting system 210. In some embodiments, a vapor stream produced from contacting system 208 is directly mixed with the feed entering contacting system 210.

A second feed enters contacting system 210 via conduit 214. In contacting system 210, contact of the feed with at least a portion of the generated hydrogen and the catalyst produces a product. The product is, in some embodiments, the total product. The product exits contacting system 210 via conduit 216.

In certain embodiments, a system that includes contacting systems, contacting zones, separation zones, and/or blending zones, as shown in FIGS. 1-8, may be located at or proximate to a production site that produces disadvantaged feed. After processing through the catalytic system, the feed and/or crude product may be considered suitable for transportation and/or for use in a refinery process.

In some embodiments, the crude product and/or the blended product are transported to a refinery and/or a treatment facility. The crude product and/or the blended product may be processed to produce commercial products such as transportation fuel, heating fuel, lubricants, or chemicals. Processing may include distilling and/or fractionally distilling the crude product and/or blended product to produce one or more distillate fractions. In some embodiments, the crude product, the blended product, and/or the one or more distillate fractions may be hydrotreated.

The total product includes, in some embodiments, at most 0.2 grams of coke, at most 0.1 grams of coke, at most 0.05 grams, at most 0.03 grams, or at most 0.01 grams of coke per gram of total product. In certain embodiments, the total product is substantially free of coke (that is, coke is not detectable). In some embodiments, the crude product may include at most 0.05 grams, at most 0.03 grams, at most 0.01 grams, at most 0.005 grams, or at most 0.003 grams of coke per gram of crude product. In certain embodiments, the crude product has a coke content in a range from above 0 to about 0.05, about 0.00001-0.03 grams, about 0.0001-0.01 grams, or about 0.001-0.005 grams per gram of crude product, or is not detectable.

In certain embodiments, the crude product has an MCR content that is at most 90%, at most 80%, at most 50%, at most 30%, or at most 10% of the MCR content of the feed. In some embodiments, the crude product has a negligible MCR content. In some embodiments, the crude product has, per gram of crude product, at most 0.05 grams, at most 0.03 grams, at most 0.01 grams, or at most 0.001 grams of MCR. Typically, the crude product has from about 0 grams to about 0.04 grams, about 0.000001-0.03 grams, or about 0.00001-0.01 grams of MCR per gram of crude product.

In some embodiments, the total product includes non-condensable gas. The non-condensable gas typically includes, but is not limited to, carbon dioxide, ammonia, hydrogen sulfide, hydrogen, carbon monoxide, methane, other hydrocarbons that are not condensable at STP, or a mixture thereof.

In certain embodiments, hydrogen gas, carbon dioxide, carbon monoxide, or combinations thereof can be formed in situ by contact of steam, light hydrocarbons, and feed with the inorganic salt catalyst. Certain embodiments of this kind of process are generally referred to as steam reforming. Reaction of feed, steam, hydrogen, and an inorganic salt catalyst may occur under circulating fluidization conditions. The inorganic salt catalysts used may include supported and non-supported inorganic salt catalysts.

In some embodiments, an inorganic salt catalyst may be selected to produce mostly gas or mostly crude product. For example, an inorganic salt catalyst that is an alkaline-earth metal oxide may be selected to produce gas and a minimal amount of crude product from a feed. The produced gas may include an enhanced amount of carbon oxides. An inorganic salt catalyst that is a mixture of carbonates may be selected to produce mostly crude product and a minimal amount of gas (e.g., in a catalytic cracking process). In some embodiments, a supported inorganic salt catalyst may be used in a fluidized catalytic cracking process.

The total amount of carbon monoxide and carbon dioxide produced may be at least 0.1 grams, at least 0.3 grams, at least 0.5 grams, at least 0.8 grams, at least 0.9 grams per gram of gas. The total amount of carbon monoxide and carbon dioxide produce may range from about 0.1 grams to 0.99 grams, about 0.2 grams to about 0.9 grams, about 0.3 grams to about 0.8 grams or about 0.4 grams to about 0.7 grams per gram of gas. A molar ratio of the generated carbon monoxide to the generated carbon dioxide, in some embodiments, is at least 0.3, at least 0.5, at least 0.7, at least 1, at least 1.5, at least 2, or at least 3. In some embodiments, a molar ratio of the generated carbon monoxide to the generated carbon dioxide is in a range from about 1:4, about 2:3, about 3:2, or about 4:1. The ability to generate carbon monoxide preferentially to carbon dioxide in situ may be beneficial to other processes located in a proximate area or upstream of the process. For example, the generated carbon monoxide may be used as a reducing agent in treating hydrocarbon formations or used in other processes, for example, syngas processes.

In some embodiments, the total product as produced herein may include crude product, hydrocarbon gases, and carbon oxide gases (carbon monoxide and carbon dioxide). A conversion of feed, based on molar amount of carbon in the feed, to total hydrocarbons (combined crude product and hydrocarbon gases) produced may be at most 50%, at most 40%, at most 30, at most 20%, at most 10%, at most 1%. A conversion of feed, based on molar amount of carbon in the feed, to hydrocarbons produced may range from 0 to about 50%, about 0.1% to about 40%, about 1% to about 30%, about 5% to about 20% or about 3% to about 10%.

A conversion of feed, based on molar amount of carbon in the feed, to total carbon oxide gases (combined carbon monoxide and carbon dioxide) produced may be at least 1%, at least 10%, at least 20%, at least 50%, at least 60%, at least 70%, at least 80%, at least 90%, or at least 95%. A conversion of feed, based on molar amount of carbon in the feed, to hydrocarbons produce may range from 0 to about 99%, about 1% to about 90%, about 5% to about 80%, about 10% to about 70%, about 20% to about 60%, about 30% to about 50%.

In some embodiments, a content of hydrogen in the total product is less than a content of hydrogen in feed, based on molar amount of hydrogen in the feed. A decreased amount of hydrogen in the total product may result in products that differ from products produced using conventional cracking, hydrotreating, and/or hydroprocessing methods.

In some embodiments, the total product as produced herein may include a mixture of compounds that have a boiling range distribution between about −10° C. and about 538° C. The mixture may include hydrocarbons that have carbon numbers in a range from 1 to 4. The mixture may include from about 0.001-0.8 grams, about 0.003-0.1 grams, or about 0.005-0.01 grams, of $C_4$ hydrocarbons per gram of such mixture. The $C_4$ hydrocarbons may include from about 0.001-0.8 grams, about 0.003-0.1 grams, or about 0.005-0.01 grams of butadiene per gram of $C_4$ hydrocarbons. In some embodiments, iso-paraffins are produced relative to n-paraffins at a weight ratio of at most 1.5, at most 1.4, at most 1.0, at most 0.8, at most 0.3, or at most 0.1. In certain embodiments, iso-paraffins are produce relative to n-paraffins at a weight ratio in a range from about 0.00001-1.5, about 0.0001-1.0, or about 0.001-0.1. The paraffins may include iso-paraffins and/or n-paraffins.

In some embodiments, the total product and/or crude product may include olefins and/or paraffins in ratios or amounts that are not generally found in crudes produced and/or retorted from a formation. The olefins include a mixture of olefins with a terminal double bond ("alpha olefins") and olefins with internal double bonds. In certain embodiments, the olefin content of the crude product is greater than the olefin content of the feed by a factor of about 2, about 10, about 50, about 100, or at least 200. In some embodiments, the olefin content of the crude product is greater than the olefin content of the feed by a factor of at most 1,000, at most 500, at most 300, or at most 250.

In certain embodiments, the hydrocarbons with a boiling range distribution between 20-400° C. have an olefins content in a range from about 0.00001-0.1 grams, about 0.0001-0.05 grams, or about 0.01-0.04 grams per gram of hydrocarbons having a boiling range distribution in a range between 20-400° C.

In some embodiments, at least 0.001 grams, at least 0.005 grams, or at least 0.01 grams of alpha olefins per gram of crude product may be produced. In certain embodiments, the crude product has from about 0.0001-0.5 grams, about 0.001-0.2 grams, or about 0.01-0.1 grams of alpha olefins per gram of crude product. In certain embodiments, the hydrocarbons with a boiling range distribution between about 20-400° C. have an alpha olefins content in a range from about 0.0001-0.08 grams, about 0.001-0.05 grams, or about 0.01-0.04 grams per gram of hydrocarbons with a boiling range distribution between about 20-400° C.

In some embodiments, the hydrocarbons with a boiling range distribution between 20-204° C. have a weight ratio of alpha olefins to internal double bond olefins of at least 0.7, at least 0.8, at least 0.9, at least 1.0, at least 1.4, or at least 1.5. In some embodiments, the hydrocarbons with a boiling range distribution between 20-204° C. have a weight ratio of alpha olefins to internal double bond olefins in a range from about 0.7-10, about 0.8-5, about 0.9-3, or about 1-2. A weight ratio of alpha olefins to internal double bond olefins of the crudes and commercial products is typically at most 0.5. The ability to produce an increased amount of alpha olefins to olefins with internal double bonds may facilitate the conversion of the crude product to commercial products.

In some embodiments, contact of a feed with a hydrogen source in the presence of an inorganic salt catalyst may produce hydrocarbons with a boiling range distribution between 20-204° C. that include linear olefins. The linear olefins have cis and trans double bonds. A weight ratio of linear olefins with trans double bonds to linear olefins with cis double bonds is at most 0.4, at most 1.0, or at most 1.4. In certain embodiments, the weight ratio of linear olefins with trans double bonds to linear olefins with cis double bonds is in a range from about 0.001-1.4, about 0.01-1.0, or about 0.1-0.4.

In certain embodiments, hydrocarbons having a boiling range distribution in a range between 20-204° C. have a n-paraffins content of at least 0.1 grams, at least 0.15 grams, at least 0.20 grams, or at least 0.30 grams per gram of hydrocarbons having a boiling range distribution in a range between 20-400° C. The n-paraffins content of such hydrocarbons, per gram of hydrocarbons, may be in a range from about 0.001-0.9 grams, about 0.1-0.8 grams, or about 0.2-0.5 grams. In some embodiments, such hydrocarbons have a weight ratio of the iso-paraffins to the n-paraffins of at most 1.5, at most 1.4, at most 1.0, at most 0.8, or at most 0.3. From the n-paraffins content in such hydrocarbons, the n-paraffins content of the crude product may be estimated to be in a range from about 0.001-0.9 grams, about 0.01-0.8 grams, or about 0.1-0.5 grams per gram of crude product.

In some embodiments, the crude product has a total Ni/V/Fe content of at most 90%, at most 50%, at most 10%, at most 5%, or at most 3% of a Ni/V/Fe content of the feed. In certain embodiments, the crude product includes, per gram of crude product, at most 0.0001 grams, at most $1 \times 10^{-5}$ grams, or at most $1 \times 10^{-6}$ grams of Ni/V/Fe. In certain embodiments, the crude product has, per gram of crude product, a total Ni/V/Fe content in a range from about $1 \times 10^{-7}$ grams to about $5 \times 10^{-5}$ grams, about $3 \times 10^{-7}$ grams to about $2 \times 10^{-5}$ grams, or about $1 \times 10^{-6}$ grams to about $1 \times 10^{-5}$ grams.

In some embodiments, the crude product has a TAN of at most 90%, at most 50%, or at most 10% of the TAN of the feed. The crude product may, in certain embodiments, have a TAN of at most 1, at most 0.5, at most 0.1, or at most 0.05. In some embodiments, TAN of the crude product may be in a range from about 0.001 to about 0.5, about 0.01 to about 0.2, or about 0.05 to about 0.1.

In certain embodiments, the API gravity of the crude product is at least 10% higher, at least 50% higher, or at least 90% higher than the API gravity of the feed. In certain embodiments, API gravity of the crude product is between about 13-50, about 15-30, or about 16-20.

In some embodiments, the crude product has a total heteroatoms content of at most 70%, at most 50%, or at most 30% of the total heteroatoms content of the feed. In certain embodiments, the crude product has a total heteroatoms content of at least 10%, at least 40%, or at least 60% of the total heteroatoms content of the feed.

The crude product may have a sulfur content of at most 90%, at most 70%, or at most 60% of a sulfur content of the feed. The sulfur content of the crude product, per gram of crude product, may be at most 0.02 grams, at most 0.008 grams, at most 0.005 grams, at most 0.004 grams, at most 0.003 grams, or at most 0.001 grams. In certain embodiments, the crude product has, per gram of crude product, a sulfur content in a range from about 0.0001-0.02 grams or about 0.005-0.01 grams.

In certain embodiments, the crude product may have a nitrogen content of at most 90% or at most 80% of a nitrogen content of the feed. The nitrogen content of the crude product, per gram of crude product, may be at most 0.004 grams, at most 0.003 grams, or at most 0.001 grams. In some embodiments, the crude product has, per gram of crude product, a nitrogen content in a range from about 0.0001-0.005 grams, or about 0.001-0.003 grams.

In some embodiments, the crude product has, per gram of crude product, from about 0.05-0.2 grams, or about 0.09-0.15 grams of hydrogen. The atomic H/C of the crude product may be at most 1.8, at most 1.7, at most 1.6, at most 1.5, or at most 1.4. In some embodiments, the atomic H/C of the crude product is about 80-120%, or about 90-110% of the atomic H/C of the feed. In other embodiments, the atomic H/C of the crude product is about 100-120% of the atomic H/C of the feed. A crude product atomic H/C within 20% of the feed atomic H/C indicates that uptake and/or consumption of hydrogen in the process is minimal.

The crude product includes components with a range of boiling points. In some embodiments, the crude product includes: at least 0.001 grams, or from about 0.001 to about 0.5 grams of hydrocarbons with a boiling range distribution of at most 200° C. or at most 204° C. at 0.101 MPa; at least 0.001 grams, or from about 0.001 to about 0.5 grams of hydrocarbons with a boiling range distribution between about 200° C. and about 300° C. at 0.101 MPa; at least 0.001 grams, or from about 0.001 to about 0.5 grams of hydrocarbons with a boiling range distribution between about 300° C. and about 400° C. at 0.101 MPa; and at least 0.001 grams, or from about 0.001 to about 0.5 grams of hydrocarbons with a boiling range distribution between about 400° C. and about 538° C. at 0.101 MPa. In some embodiments, the crude product includes, per gram of crude product, from about 0.001 grams to about 0.9 grams, from about 0.005 grams to about 0.8 grams, from about 0.01 grams to about 0.7 grams, or from about 0.1 gram to about 0.6 grams of hydrocarbons with a boiling range distribution between about 204° C. and 343° C.

In some embodiments, the crude product has, per gram of crude product, a naphtha content from about 0.00001-0.2 grams, about 0.0001-0.1 grams, or about 0.001-0.05 grams. In certain embodiments, the crude product has from 0.001-0.2 grams or 0.01-0.05 grams of naphtha. In some embodiments, the naphtha has at most 0.15 grams, at most 0.1 grams, or at most 0.05 grams of olefins per gram of naphtha. The crude product has, in certain embodiments, from 0.00001-0.15 grams, 0.0001-0.1 grams, or 0.001-0.05 grams of olefins per gram of crude product. In some embodiments, the naphtha has, per gram of naphtha, a benzene content of at most 0.01 grams, at most 0.005 grams, or at most 0.002 grams. In certain embodiments, the naphtha has a benzene content that is non-detectable, or in a range from about $1 \times 10^{-7}$ grams to about $1 \times 10^{-2}$ grams, about $1 \times 10^{-6}$ grams to about $1 \times 10^{-5}$ grams, about $5 \times 10^{-6}$ grams to about $1 \times 10^{-4}$ grams. Compositions that contain benzene may be considered hazardous to handle, thus a crude product that has a relatively low benzene content may not require special handling.

In certain embodiments, naphtha may include aromatic compounds. Aromatic compounds may include monocyclic ring compounds and/or polycyclic ring compounds. The monocyclic ring compounds may include, but are not limited to, benzene, toluene, ortho-xylene, meta-xylene, para-xylene, ethyl benzene; 1-ethyl-3-methyl benzene; 1-ethyl-2-methyl benzene; 1,2,3-trimethyl benzene; 1,3,5-trimethyl benzene; 1-methyl-3-propyl benzene; 1-methyl-2-propyl benzene; 2-ethyl-1,4-dimethyl benzene; 2-ethyl-2,4-dimethyl benzene; 1,2,3,4-tetra-methyl benzene; ethyl, pentylmethyl benzene; 1,3 diethyl-2,4,5,6-tetramethyl benzene; triisopropyl-ortho-xylene; substituted congeners of benzene, toluene, ortho-xylene, meta-xylene, para-xylene, or mixtures thereof. Monocyclic aromatics are used in a variety of commercial products and/or sold as individual components. The crude product produced as described herein typically has an enhanced content of monocyclic aromatics.

In certain embodiments, the crude product has, per gram of crude product, a toluene content from about 0.001-0.2 grams, about 0.05-0.15 grams, or about 0.01-0.1 grams. The crude product has, per gram of crude product, a meta-xylene content from about 0.001-0.1 grams, about 0.005-0.09 grams, or about 0.05-0.08 grams. The crude product has, per gram of crude product, an ortho-xylene content from about 0.001-0.2 grams, about 0.005-0.1 grams, or about 0.01-0.05 grams. The crude product has, per gram of crude product, a para-xylene content from about 0.001-0.09 grams, about 0.005-0.08 grams, or about 0.001-0.06 grams.

An increase in the aromatics content of naphtha tends to increase the octane number of the naphtha. Crudes may be valued based on an estimation of a gasoline potential of the crudes. Gasoline potential may include, but is not limited to, a calculated octane number for the naphtha portion of the crudes. Crudes typically have calculated octane numbers in a range of about 35-60. The octane number of gasoline tends to reduce the requirement for additives that increase the octane number of the gasoline. In certain embodiments, the crude product includes naphtha that has an octane number of at least 60, at least 70, at least 80, or at least 90. Typically, the octane number of the naphtha is in a range from about 60-99, about 70-98, or about 80-95.

In some embodiments, the crude product has a higher total aromatics content in hydrocarbons having a boiling range distribution between 204° C. and 500° C. (total "naphtha and kerosene") relative to the total aromatics content in the total naphtha and kerosene of the feed by at least 5%, at least 10%, at least 50%, or at least 99%. Typically, the total aromatics content in the total naphtha and kerosene of feed is about 8%, about 20%, about 75%, or about 100% greater than the total aromatics content in the total naphtha and kerosene of the feed.

In some embodiments, the kerosene and naphtha may have a total polyaromatic compounds content in a range from about 0.00001-0.5 grams, about 0.0001-0.2 grams, or about 0.001-0.1 grams per gram of total kerosene and naphtha.

The crude product has, per gram of crude product, a distillate content in a range from about 0.0001-0.9 grams, from about 0.001-0.5 grams, from about 0.005-0.3 grams, or from about 0.01-0.2 grams. In some embodiments, a weight ratio of kerosene to diesel in the distillate, is in a range from about 1:4 to about 4:1, about 1:3 to about 3:1, or about 2:5 to about 5:2.

In some embodiments, crude product has, per gram of crude product, at least 0.001 grams, from above 0 to about 0.7 grams, about 0.001-0.5 grams, or about 0.01-0.1 grams of kerosene. In certain embodiments, the crude product has from 0.001-0.5 grams or 0.01-0.3 grams of kerosene. In some embodiments, the kerosene has, per gram of kerosene, an aromatics content of at least 0.2 grams, at least 0.3 grams, or at least 0.4 grams. In certain embodiments, the kerosene has, per gram of kerosene, an aromatics content in a range from about 0.1-0.5 grams, or from about 0.2-0.4 grams.

In certain embodiments, a freezing point of the kerosene may be below −30° C., below −40° C., or below −50° C. An increase in the content of aromatics of the kerosene portion of the crude product tends to increase the density and reduce the freezing point of the kerosene portion of the crude product. A crude product with a kerosene portion having a high density and low freezing point may be refined to produce aviation turbine fuel with the desirable properties of high density and low freezing point.

In certain embodiments, the crude product has, per gram of crude product, a diesel content in a range from about 0.001-0.8 grams or from about 0.01-0.4 grams. In certain embodiments, the diesel has, per gram of diesel, an aromatics content of at least 0.1 grams, at least 0.3 grams, or at least 0.5 grams. In some embodiments, the diesel has, per gram of diesel, an aromatics content in a range from about 0.1-1 grams, about 0.3-0.8 grams, or about 0.2-0.5 grams.

In some embodiments, the crude product has, per gram of crude product, a VGO content in a range from about 0.0001-0.99 grams, from about 0.001-0.8 grams, or from about 0.1-0.3 grams. In certain embodiments, the VGO content in the crude product is in a range from 0.4-0.9 grams, or about 0.6-0.8 grams per gram of crude product. In certain embodiments, the VGO has, per gram of VGO, an aromatics content in a range from about 0.1-0.99 grams, about 0.3-0.8 grams, or about 0.5-0.6 grams.

In some embodiments, the crude product has a residue content of at most 70%, at most 50%, at most 30%, at most 10%, or at most 1% of the feed. In certain embodiments, the crude product has, per gram of crude product, a residue content of at most 0.1 grams, at most 0.05 grams, at most 0.03 grams, at most 0.02 grams, at most 0.01 grams, at most 0.005 grams, or at most 0.001 grams. In some embodiments, the crude product has, per gram of crude product, a residue content in a range from about 0.000001-0.1 grams, about 0.00001-0.05 grams, about 0.001-0.03 grams, or about 0.005-0.04 grams.

In some embodiments, the crude product may include at least a portion of the catalyst. In some embodiments, a crude product includes from greater than 0 grams, but less than 0.01 grams, about 0.000001-0.001 grams, or about 0.00001-0.0001 grams of catalyst per gram of crude product. The catalyst may assist in stabilizing the crude product during transportation and/or treatment in processing facilities. The catalyst may inhibit corrosion, inhibit friction, and/or increase water separation abilities of the crude product. A crude product that includes at least a portion of the catalyst may be further processed to produce lubricants and/or other commercial products.

The catalyst used for treatment of a feed in the presence of a hydrogen source to produce the total product may be a single catalyst or a plurality of catalysts. The catalysts of the application may first be a catalyst precursor that is converted to the catalyst in the contacting zone when hydrogen and/or a feed containing sulfur is contacted with the catalyst precursor.

The catalysts used in contacting the feed with a hydrogen source to produce the total product may assist in the reduction of the molecular weight of the feed. Not to be bound by theory, the catalyst in combination with the hydrogen source may reduce a molecular weight of components in the feed through the action of basic (Lewis basic or Brønsted-Lowry basic) and/or superbasic components in the catalyst. Examples of catalysts that may have Lewis base and/or Brønsted-Lowry base properties include catalysts described herein.

In some embodiments, the catalyst is an inorganic salt catalyst. The anion of the inorganic salt catalyst may include an inorganic compound, an organic compound, or mixtures thereof. The inorganic salt catalyst includes alkali metal carbonates, alkali metal hydroxides, alkali metal hydrides, alkali metal amides, alkali metal sulfides, alkali metal acetates, alkali metal oxalates, alkali metal formates, alkali metal pyruvates, alkaline-earth metal carbonates, alkaline-earth metal hydroxides, alkaline-earth metal hydrides, alkaline-earth metal amides, alkaline-earth metal sulfides, alkaline-earth metal acetates, alkaline-earth metal oxalates, alkaline-earth metal formates, alkaline-earth metal pyruvates, or mixtures thereof.

Inorganic salt catalysts include, but are not limited to, mixtures of: NaOH/RbOH/CsOH; KOH/RbOH/CsOH; NaOH/KOH/RbOH; NaOH/KOH/CsOH; $K_2CO_3/Rb_2CO_3/Cs_2CO_3$; $Na_2O/K_2O/K_2CO_3$; $NaHCO_3/KHCO_3/Rb_2CO_3$; $LiHCO_3/KHCO_3/Rb_2CO_3$; KOH/RbOH/CsOH mixed with a mixture of $K_2CO_3/Rb_2CO_3/Cs_2CO_3$; $K_2CO_3/CaCO_3$; $K_2CO_3/MgCO_3$; $Cs_2CO_3/CaCO_3$; $Cs_2CO_3/CaO$; $Na_2CO_3/Ca(OH)_2$; $KH/CsCO_3$; $KOCHO/CaO$; $CsOCHO/CaCO_3$; $CsOCHO/Ca(OCHO)_2$; $NaNH_2/K_2CO_3/Rb_2O$; $K_2CO_3/CaCO_3/Rb_2CO_3$; $K_2CO_3/CaCO_3/Cs_2CO_3$; $K_2CO_3/MgCO_3/Rb_2CO_3$; $K_2CO_3/MgCO_3/Cs_2CO_3$; or $Ca(OH)_2$ mixed with a mixture of $K_2CO_3/Rb_2CO_3/Cs_2CO_3$. In some embodiments, the inorganic salt catalyst is limestone ($CaCO_3$) or dolomite ($CaMg(CO_3)_2$).

In some embodiments, the inorganic salt catalyst is a alkaline-earth metal oxide or a combination of alkaline-metal oxides In some embodiments, the inorganic salt catalyst also includes alkaline-earth metal oxides and/or oxides of metals from Column 13 of the Periodic Table. Metals from Column 13 include, but are not limited to, boron or aluminum. Non-limiting examples of metal oxides include lithium oxide ($Li_2O$), potassium oxide ($K_2O$), calcium oxide (CaO), magnesium oxide (MgO), or aluminum oxide ($Al_2O_3$).

In certain embodiments, an inorganic salt catalyst includes one or more alkali metal salts that include an alkali metal with an atomic number of at least 11. An atomic ratio of an alkali metal having an atomic number of at least 11 to an alkali metal having an atomic number greater than 11, in some embodiments, is in a range from about 0.1 to about 10, about 0.2 to about 6, or about 0.3 to about 4 when the inorganic salt catalyst has two or more alkali metals. For example, the inorganic salt catalyst may include salts of sodium, potassium, and rubidium with the ratio of sodium to potassium being in a range from about 0.1-6; the ratio of sodium to rubidium being in a range from about 0.1-6; and the ratio of potassium to rubidium being in a range from about 0.1-6. In another example, the inorganic salt catalyst includes a sodium salt and a potassium salt with the atomic ratio of sodium to potassium being in a range from about 0.1 to about 4.

In some embodiments, an inorganic salt catalyst also includes metals from Columns 8-10 of the Periodic Table, compounds of metals from Columns 8-10 of the Periodic Table, metals from Column 6 of the Periodic Table, compounds of metals from Column 6 of the Periodic Table, or mixtures thereof. Metals from Columns 8-10 include, but are not limited to, iron, ruthenium, cobalt, or nickel. Metals from Column 6 include, but are not limited to, chromium, molybdenum, or tungsten. In some embodiments, the inorganic salt catalyst includes about 0.1-0.5 grams, or about 0.2-0.4 grams of Raney nickel per gram of inorganic salt catalyst.

In some embodiments, the inorganic salt catalyst contains at most 0.00001 grams, at most 0.001 grams, or at most 0.01 grams of lithium, calculated as the weight of lithium, per gram of inorganic salt catalyst. The inorganic salt catalyst has, in some embodiments, from about 0 but less than 0.01 grams, about 0.0000001-0.001 grams, or about 0.00001-0.0001 grams of lithium, calculated as the weight of lithium, per gram of inorganic salt catalyst.

The inorganic salt catalyst is, in certain embodiments, free of or substantially free of Lewis acids (for example, $BCl_3$, $AlCl_3$, and $SO_3$), Brønsted-Lowry acids (for example, $H_3O^+$, $H_2SO_4$, HCl, and $HNO_3$), glass-forming compositions (for example, borates and silicates), and halides. The inorganic salt may contain, per gram of inorganic salt catalyst: from about 0 grams to about 0.1 grams, about 0.000001-0.01 grams, or about 0.00001-0.005 grams of: a) halides; b) compositions that form glasses at temperatures of at least 350° C., or at most 1000° C.; c) Lewis acids; d) Brønsted-Lowry acids; or e) mixtures thereof.

The inorganic salt catalyst may be prepared using standard techniques. For example, a desired amount of each component of the catalyst may be combined using standard mixing techniques (for example, milling and/or pulverizing). In other embodiments, inorganic compositions are dissolved in a solvent (for example, water or a suitable organic solvent) to form an inorganic composition/solvent mixture. The solvent may be removed using standard separation techniques to produce the inorganic salt catalyst.

In some embodiments, inorganic salts of the inorganic salt catalyst may be incorporated into a support to form a supported inorganic salt catalyst. The support, in some embodiments, exhibits chemical resistance to the basicity of the inorganic salt at high temperatures. The support may have the ability to absorb heat (for example, have a high heat capacity). The ability of the support of the inorganic salt catalyst to absorb heat may allow temperatures in the contacting zone to be reduced as compared to the temperature of the contacting zone when an unsupported inorganic salt catalyst is used. Examples of supports include, but are not limited to, zirconium oxide, calcium oxide, magnesium oxide, titanium oxide, hydrotalcite, germania, iron oxide, nickel oxide, zinc oxide, cadmium oxide, antimony oxide, calcium magnesium carbonate, aluminosilicate, limestone, dolomite, activated carbon, nonvolatile charcoal, and mixtures thereof. In some embodiments, an inorganic salt, a Columns 6-10 metal, and/or a compound of a Columns 6-10 metal may be impregnated in the support. In certain embodiments, the compound of a Columns 6-10 metal is a metal sulfide (for example, nickel sulfide, vanadium sulfide, molybdenum sulfide, tungsten sulfide, iron sulfide). Alternatively, inorganic salts may be melted or softened with heat and forced in and/or onto a metal support or metal oxide support to form a supported inorganic salt catalyst. In some embodiments, a spent hydroprocessing catalyst is combined with the inorganic salt catalyst support and/or used with an inorganic salt catalyst. In some embodiments, metals and/or compounds of metals recovered from a total product/feed mixture is combined the inorganic salt catalyst support and/or used with an inorganic salt catalyst.

In some embodiments, an inorganic salt catalyst is mixed with a Column 4 metal oxide. Column 4 metal oxides include, but are not limited to, $ZrO_2$ and/or $TiO_2$. A molar ratio of inorganic salt catalyst to Column 4 metal oxide may range from about 0.01 to about 5, from about 0.5 to about 4, or from about 1 to about 3.

In some embodiments, the supported inorganic salt catalyst is characterized using particle size. The particle size of a supported inorganic salt catalyst may range from about 20 micrometers to about 500 micrometers, from about 30 micrometers to about 400 micrometers, from about 50 micrometers to about 300 micrometers, or from about 100 to 200 micrometers.

In some embodiments, a structure of the inorganic salt catalyst typically becomes nonhomogenous, permeable, and/ or mobile at a determined temperature or in a temperature range when loss of order occurs in the catalyst structure. The inorganic salt catalyst may become disordered without a substantial change in composition (for example, without decomposition of the salt). Not to be bound by theory, it is believed that the inorganic salt catalyst becomes disordered (mobile) when distances between ions in the lattice of the inorganic salt catalyst increase. As the ionic distances increase, a feed and/or a hydrogen source may permeate through the inorganic salt catalyst instead of across the surface of the inorganic salt catalyst. Permeation of the feed and/or hydrogen source through the inorganic salt often results in an increase in the contacting area between the inorganic salt catalyst and the feed and/or the hydrogen source. An increase in contacting area and/or reactivity area of the inorganic salt catalyst may often increase the yield of crude product, limit production of residue and/or coke, and/or facilitate a change in properties in the crude product relative to the same properties of the feed. Disorder of the inorganic salt catalyst (for example, nonhomogeneity, permeability, and/or mobility) may be determined using DSC methods, ionic conductivity measurement methods, TAP methods, visual inspection, x-ray diffraction methods, or combinations thereof.

The use of TAP to determine characteristics of catalysts is described in U.S. Pat. No. 4,626,412 to Ebner et al.; U.S. Pat. No. 5,039,489 to Gleaves et al.; and U.S. Pat. No. 5,264,183 to Ebner et al., all of which are incorporated herein by reference. A TAP system may be obtained from Mithra Technologies (Foley, Mo., U.S.A.). The TAP analysis may be performed in a temperature range from about 25-850° C., about 50-500° C., or about 60-400° C., at a heating rate in a range from about 10-50° C., or about 20-40° C., and at a vacuum in a range from about $1\times10^{-13}$ to about $1\times10^{-8}$ torr. The temperature may remain constant and/or increase as a function of time. As the temperature of the inorganic salt catalyst increases, gas emission from the inorganic salt catalyst is measured. Examples of gases that evolve from the inorganic salt catalyst include carbon monoxide, carbon dioxide, hydrogen, water, or mixtures thereof. The temperature at which an inflection (sharp increase) in gas evolution from the inorganic salt catalyst is detected is considered to be the temperature at which the inorganic salt catalyst becomes disordered.

In some embodiments, an inflection of emitted gas from the inorganic salt catalyst may be detected over a range of temperatures as determined using TAP. The temperature or the temperature range is referred to as the "TAP temperature". The initial temperature of the temperature range determined using TAP is referred to as the "minimum TAP temperature".

The emitted gas inflection exhibited by inorganic salt catalysts suitable for contact with a feed is in a TAP temperature range from about 100-600° C., about 200-500° C., or about 300-400° C. Typically, the TAP temperature is in a range from about 300-500° C. In some embodiments, different compositions of suitable inorganic salt catalysts also exhibit gas inflections, but at different TAP temperatures.

The magnitude of the ionization inflection associated with the emitted gas may be an indication of the order of the particles in a crystal structure. In a highly ordered crystal structure, the ion particles are generally tightly associated, and release of ions, molecules, gases, or combinations thereof, from the structure requires more energy (that is more heat). In a disordered crystal structure, ions are not associated to each other as strongly as ions in a highly ordered crystal structure. Due to the lower ion association, less energy is generally required to release ions, molecules, and/or gases from a disordered crystal structure, and thus, a quantity of ions and/or gas released from a disordered crystal structure is typically greater than a quantity of ions and/or gas released from a highly ordered crystal structure at a selected temperature.

In some embodiments, a heat of dissociation of the inorganic salt catalyst may be observed in a range from about 50° C. to about 500° C. at a heating rate or cooling rate of about 10° C., as determined using a differential scanning calorimeter. In a DSC method, a sample may be heated to a first temperature, cooled to room temperature, and then heated a second time. Transitions observed during the first heating generally are representative of entrained water and/or solvent and may not be representative of the heat of dissociations. For example, easily observed heat of drying of a moist or hydrated sample may generally occur below 250° C., typically between 100-150° C. The transitions observed during the cooling cycle and the second heating correspond to the heat of dissociation of the sample.

"Heat transition" refers to the process that occurs when ordered molecules and/or atoms in a structure become disordered when the temperature increases during the DSC analysis. "Cool transition" refers to the process that occurs when molecules and/or atoms in a structure become more homogeneous when the temperature decreases during the DSC analysis. In some embodiments, the heat/cool transition of the inorganic salt catalyst occurs over a range of temperatures that are detected using DSC. The temperature or temperature range at which the heat transition of the inorganic salt catalyst occurs during a second heating cycle is referred to as "DSC temperature". The lowest DSC temperature of the temperature range during a second heating cycle is referred to as the "minimum DSC temperature". The inorganic salt catalyst may exhibit a heat transition in a range between about 200-500° C., about 250-450° C., or about 300-400° C.

In an inorganic salt that contains inorganic salt particles that are a relatively homogeneous mixture, a shape of the peak associated with the heat absorbed during a second heating cycle may be relatively narrow. In an inorganic salt catalyst that contains inorganic salt particles in a relatively non-homogeneous mixture, the shape of the peak associated with heat absorbed during a second heating cycle may be relatively broad. An absence of peaks in a DSC spectrum indicates that the salt does not absorb or release heat in the scanned temperature range. Lack of a heat transition generally indicates that the structure of the sample does not change upon heating.

As homogeneity of the particles of an inorganic salt mixture increases, the ability of the mixture to remain a solid and/or a semiliquid during heating decreases. Homogeneity of an inorganic mixture may be related to the ionic radius of the cations in the mixtures. For cations with smaller ionic radii, the ability of a cation to share electron density with a corresponding anion increases and the acidity of the corresponding anion increases. For a series of ions of similar charges, a smaller ionic radius results in higher interionic attractive forces between the cation and the anion if the anion is a hard base. The higher interionic attractive forces tend to result in higher heat transition temperatures for the salt and/or more homogeneous mixture of particles in the salt (sharper peak and increased area under the DSC curve). Mixtures that include cations with small ionic radii tend to be more acidic than cations of larger ionic radii, and thus acidity of the inorganic salt mixture increases with decreasing cationic radii. For example, contact of a feed with a hydrogen source in the presence of an inorganic mixture that includes lithium cations tends to produce increased quantities of gas and/or coke relative to contact of the feed with a hydrogen source in the presence of an inorganic salt catalyst that includes cations with a larger ionic radii than lithium. The ability to inhibit generation of gas and/or coke increases the total liquid product yield of the process.

In certain embodiments, the inorganic salt catalyst may include two or more inorganic salts. A minimum DSC temperature for each of the inorganic salts may be determined. The minimum DSC temperature of the inorganic salt catalyst may be below the minimum DSC temperature of at least one of the inorganic metal salts in the inorganic salt catalyst. For example, the inorganic salt catalyst may include potassium carbonate and cesium carbonate. Potassium carbonate and cesium carbonate exhibit DSC temperatures greater than 500° C. A $K_2CO_3/Rb_2CO_3/Cs_2CO_3$ catalyst exhibits a DSC temperature in a range from about 290-300° C.

In some embodiments, the TAP temperature may be between the DSC temperature of at least one of the inorganic salts and the DSC temperature of the inorganic salt catalyst. For example, the TAP temperature of the inorganic salt catalyst may be in a range from about 350-500° C. The DSC temperature of the same inorganic salt catalyst may be in a range from about 200-300° C., and the DSC temperature of the individual salts may be at least 500° C. or at most 1000° C.

An inorganic salt catalyst that has a TAP and/or DSC temperature between about 150-500° C., about 200-450° C., or about 300-400° C., and does not undergo decomposition at these temperatures, in many embodiments, can be used to catalyze conversion of high molecular weight and/or high viscosity compositions (for example, feed) to liquid products.

In certain embodiments, the inorganic salt catalyst may exhibit increased conductivity relative to individual inorganic salts during heating of the inorganic salt catalyst in a temperature range from about 200-600° C., about 300-500° C., or about 350-450° C. Increased conductivity of the inorganic salt catalyst is generally attributed to the particles in the inorganic salt catalyst becoming mobile. The ionic conductivity of some inorganic salt catalysts changes at a lower temperature than the temperature at which ionic conductivity of a single component of the inorganic salt catalyst changes.

Ionic conductivity of inorganic salts may be determined by applying Ohm's law: V=IR, where V is voltage, I is current, and R is resistance. To measure ionic conductivity, the inorganic salt catalyst may be placed in a quartz vessel with two wires (for example, copper wires or platinum wires) separated from each other, but immersed in the inorganic salt catalyst.

FIG. 9 is a schematic of a system that may be used to measure ionic conductivity. Quartz vessel 220 containing sample 222 may be placed in a heating apparatus and heated incrementally to a desired temperature. Voltage from source 224 is applied to wire 226 during heating. The resulting current through wires 226 and 228 is measured at meter 230. Meter 230 may be, but is not limited to, a multimeter or a Wheatstone bridge. As sample 222 becomes less homogeneous (more mobile) without decomposition occurring, the resistivity of the sample should decrease and the observed current at meter 230 should increase.

In some embodiments, at a desired temperature, the inorganic salt catalyst may have a different ionic conductivity after heating, cooling, and then heating. The difference in ionic conductivities may indicate that the crystal structure of the inorganic salt catalyst has been altered from an original shape (first form) to a different shape (second form) during heating. The ionic conductivities, after heating, are expected to be similar or the same if the form of the inorganic salt catalyst does not change during heating.

In certain embodiments, the inorganic salt catalyst has a particle size in a range of about 10-1000 micrometers, about 20-500 micrometers, or about 50-100 micrometers, as determined by passing the inorganic salt catalyst through a mesh or a sieve.

The inorganic salt catalyst may soften when heated to temperatures above 50° C. and below 500° C. As the inorganic salt catalyst softens, liquids and catalyst particles may co-exist in the matrix of the inorganic salt catalyst. The catalyst particles may, in some embodiments, self-deform under gravity, or under a pressure of at least 0.007 MPa, or at most 0.101 MPa, when heated to a temperature of at least 300° C., or at most 800° C., such that the inorganic salt catalyst transforms from a first form to a second form. Upon cooling of the inorganic salt catalyst to about 20° C., the second form of the inorganic salt catalyst is incapable of returning to the first form of the inorganic salt catalyst. The temperature at which the inorganic salt transforms from the first form to a second form is referred to as the "deformation" temperature. The deformation temperature may be a temperature range or a single temperature. In certain embodiments, the particles of the inorganic salt catalyst self-deform under gravity or pressure upon heating to a deformation temperature below the deformation temperature of any of the individual inorganic metal salts. In some embodiments, an inorganic salt catalyst includes two or more inorganic salts that have different deformation temperatures. The deformation temperature of the inorganic salt catalyst differs, in some embodiments, from the deformation temperatures of the individual inorganic metal salts.

In certain embodiments, the inorganic salt catalyst is liquid and/or semiliquid at, or above, the TAP and/or DSC temperature. In some embodiments, the inorganic salt catalyst is a liquid or a semiliquid at the minimum TAP and/or DSC temperature. At or above the minimum TAP and/or DSC temperature, liquid or semiliquid inorganic salt catalyst mixed with the feed may, in some embodiments, form a separate phase from the feed. In some embodiments, the liquid or semiliquid inorganic salt catalyst has low solubility in the feed (for example, from about 0 grams to about 0.5 grams, about 0.0000001-0.2 grams, or about 0.0001-0.1 grams of inorganic salt catalyst per gram of feed) or is insoluble in the feed (for example, from about 0 grams to about 0.05 grams, about 0.000001-0.01 grams, or about 0.00001-0.001 grams of inorganic salt catalyst per gram of feed) at the minimum TAP temperature.

In some embodiments, powder x-ray diffraction methods are used to determine the spacing of the atoms in the inorganic salt catalyst. A shape of the $D_{001}$ peak in the x-ray spectrum may be monitored and the relative order of the inorganic salt particles may be estimated. Peaks in the x-ray diffraction represent different compounds of the inorganic salt catalyst. In powder x-ray diffraction, the $D_{001}$ peak may be monitored and the spacing between atoms may be estimated. In an inorganic salt catalyst that contains highly ordered inorganic salt atoms, a shape of the $D_{001}$ peak is relatively narrow. In an inorganic salt catalyst (for example, a $K_2CO_3/Rb_2CO_3/Cs_2CO_3$ catalyst) that contains randomly ordered inorganic salt atoms, the shape of the $D_{001}$ peak may be relatively broad or the $D_{001}$ peak may be absent. To determine if the disorder of inorganic salt atoms changes during heating, an x-ray diffraction spectrum of the inorganic salt catalyst may be taken before heating and compared with an x-ray diffraction spectrum taken after heating. The $D_{001}$ peak (corresponding to the inorganic salt atoms) in the x-ray diffraction spectrum taken at temperatures above 50° C. may be absent or broader than the $D_{001}$ peaks in the x-ray diffraction spectrum taken at temperatures below 50° C. Additionally, the x-ray diffraction pattern of the individual inorganic salt may exhibit relatively narrow $D_{001}$ peaks at the same temperatures.

Contacting conditions may be controlled such that the total product composition (and thus, the crude product) may be varied for a given feed in addition to limiting and/or inhibiting formation of by-products. The total product composition includes, but is not limited to, paraffins, olefins, aromatics, or mixtures thereof. These compounds make up the compositions of the crude product and the non-condensable hydrocarbon gases.

Controlling contacting conditions in combination with the catalyst described herein may produce a total product with lower than predicted coke content. Comparison of the MCR content of various crudes may allow crudes to be ranked based on their tendency to form coke. For example, a crude with a MCR content of about 0.1 grams of MCR per gram of crude would be expected to form more coke than a crude with a MCR content of about 0.001 grams of MCR per gram of crude. Disadvantaged crudes typically have MCR contents of at least 0.05 grams of MCR per gram of disadvantaged crude.

In some embodiments, the residue content and/or coke content deposited on the catalyst during a reaction period may be at most 0.2 grams, at most 0.1 grams, at most 0.05 grams, or at most 0.03 grams of residue and/or coke per gram of catalyst. In certain embodiments, the weight of residue and/or coke deposited on the catalyst is in a range from about 0.0001-0.1 grams, 0.001-0.05 grams, or about 0.01-0.03 grams. In some embodiments, used catalyst is substantially free of residue and/or coke. In certain embodiments, contacting conditions are controlled such that at most 0.2 grams, at most 0.1 grams, at most 0.05 grams, at most 0.015 grams, at most 0.01 grams, at most 0.005 grams, or at most 0.003 grams of coke is formed per gram of crude product. Contacting a feed with the catalyst under controlled contacting conditions produces a reduced quantity of coke and/or residue relative to a quantity of coke and/or residue produced by heating the feed in the presence of a refining catalyst, or in the absence of a catalyst, using the same contacting conditions.

The contacting conditions may be controlled, in some embodiments, such that, per gram of feed, at least 0.5 grams, at least 0.7 grams, at least 0.8 grams, or at least 0.9 grams of the feed is converted to the crude product. Typically, between about 0.5-0.99 grams, about 0.6-0.9 grams, or about 0.7-0.8 grams of the crude product per gram of feed is produced during contacting. Conversion of the feed to a crude product with a minimal yield of residue and/or coke, if any, in the crude product allows the crude product to be converted to commercial products with a minimal amount of pre-treatment at a refinery. In certain embodiments, per gram of feed, at most 0.2 grams, at most 0.1 grams, at most 0.05 grams, at most 0.03 grams, or at most 0.01 grams of the feed is converted to non-condensable hydrocarbons. In some embodiments, from about 0 to about 0.2 grams, about 0.0001-0.1 grams, about 0.001-0.05 grams, or about 0.01-0.03 grams of non-condensable hydrocarbons per gram of feed is produced.

Controlling a contacting zone temperature, rate of feed flow, rate of total product flow, rate and/or amount of catalyst feed, rate of steam flow, or combinations thereof, may be performed to maintain desired reaction temperatures. In some embodiments, control of the temperature in the contacting zone may be performed by changing a flow of a gaseous hydrogen source and/or inert gas through the contacting zone to dilute the amount of hydrogen and/or remove excess heat from the contacting zone.

In some embodiments, the temperature in the contacting zone may be controlled such that a temperature in the contacting zone is at, above, or below desired temperature "$T_1$".

In certain embodiments, the contacting temperature is controlled such that the contacting zone temperature is below the minimum TAP temperature and/or the minimum DSC temperature. In certain embodiments, $T_1$ may be about 30° C. below, about 20° C. below, or about 10° C. below the minimum TAP temperature and/or the minimum DSC temperature. For example, in one embodiment, the contacting temperature may be controlled to be about 370° C., about 380° C., or about 390° C. during the reaction period when the minimum TAP temperature and/or minimum DSC temperature is about 400° C.

In other embodiments, the contacting temperature is controlled such that the temperature is at, or above, the catalyst TAP temperature and/or the catalyst DSC temperature. For example, the contacting temperature may be controlled to be about 450° C., about 500° C., or about 550° C. during the reaction period when the minimum TAP temperature and/or minimum DSC temperature is about 450° C. Controlling the contacting temperature based on catalyst TAP temperatures and/or catalyst DSC temperatures may yield improved crude product properties. Such control may, for example, decrease coke formation, decrease non-condensable gas formation, or combinations thereof.

In certain embodiments, the inorganic salt catalyst may be conditioned prior to addition of the feed. In some embodiments, the conditioning may take place in the presence of the feed. Conditioning the inorganic salt catalyst may include heating the inorganic salt catalyst to a first temperature of at least 100° C., at least 300° C., at least 400° C., or at least 500° C., and then cooling the inorganic salt catalyst to a second temperature of at most 250° C., at most 200° C., or at most 100° C. In certain embodiments, the inorganic salt catalyst is heated to a temperature in a range from about 150-700° C., about 200-600° C., or about 300-500° C., and then cooled to a second temperature in a range from about 25-240° C., about 30-200° C., or about 50-90° C. The conditioning temperatures may be determined by determining ionic conductivity measurements at different temperatures. In some embodiments, conditioning temperatures may be determined from DSC temperatures obtained from heat/cool transitions obtained by heating and cooling the inorganic salt catalyst multiple times in a DSC. Conditioning of the inorganic salt catalyst may allow contact of a feed to be performed at lower reaction temperatures than temperatures used with conventional hydroprocessing catalysts.

In certain embodiments, varying a ratio of catalyst to feed may affect the amount of gas, crude product, and/or coke formed during contacting. A ratio supported inorganic catalyst to feed may range from 2-10 or be greater than 10. The conversion of feed to total product may be at least 50%, at least 60%, at least 80%, at least 90%, at least 99%. The content of gas in the total product may range be, per gram of feed, at least 0.1 grams, at least 0.5 grams, at least 0.7 grams, at least 0.9 grams or at least 0.95 grams. The content of produced product may range, per gram of feed, from about 0.1 grams to 0.99 grams, 0.3 grams to 0.9 grams, or from about 0.5 gram to about 0.7 grams. The content crude product in the total product may range be, per gram of feed, at least 0.1 grams, at least 0.5 grams, at least 0.7 grams, at least 0.9 grams or at least 0.95 grams. The content of produced crude product may range, per gram of feed, from about 0.1 grams to 0.99 grams, 0.3 grams to 0.9 grams, or from about 0.5 gram to about 0.7 grams. At most, per gram of feed, 0.2 grams, at most 0.1 grams, at most 0.05 grams of coke may be formed.

In some embodiments, a content of naphtha, distillate, VGO, or mixtures thereof, in the total product, may be varied by changing a rate of total product removal from a contacting zone. For example, decreasing a rate of total product removal tends to increase contacting time of the feed with the catalyst. Alternately, increasing pressure relative to an initial pressure may increase contacting time, may increase a yield of a crude product, may increase incorporation of hydrogen from the gases into a crude product for a given mass flow rate of feed or hydrogen source, or may alter combinations of these effects. Increased contacting times of the feed with the catalyst may produce an increased amount of diesel, kerosene, or naphtha and a decreased amount of VGO relative to the amounts of diesel, kerosene, naphtha, and VGO produced at shorter contacting times. Increasing the contacting time of the total product in the contacting zone may also change the average carbon number of the crude product. Increased contacting time may result in a higher weight percentage of lower carbon numbers (and thus, a higher API gravity).

In some embodiments, the contacting conditions may be changed over time. For example, the contacting pressure and/or the contacting temperature may be increased to increase the amount of hydrogen that the feed uptakes to produce the crude product. The ability to change the amount of hydrogen uptake of the feed, while improving other properties of the feed, increases the types of crude products that may be produced from a single feed. The ability to produce multiple crude products from a single feed may allow different transportation and/or treatment specifications to be satisfied.

Contacting a feed with an inorganic salt catalyst in the presence of light hydrocarbons and steam generates hydrogen and carbon monoxide in situ. The carbon monoxide reacts with more steam to produce carbon dioxide and more hydrogen. The hydrogen may be incorporated into the feed under basic conditions to form new products. Controlling the amount of steam, the temperature of the contacting zone, and selection of catalyst may produce hydrocarbons from the feed that differ from hydrocarbons obtained from conventional catalytic cracking methods.

Uptake of hydrogen may be assessed by comparing the atomic H/C of the feed to H/C of the crude product. An increase in the atomic H/C of the crude product relative to the atomic H/C of the feed indicates incorporation of hydrogen into the crude product from the hydrogen source. Relatively low increase in the atomic H/C of the crude product (about 20%, as compared to the feed) indicates relatively low consumption of hydrogen gas during the process. Significant improvement of the crude product properties, relative to those of the feed, obtained with minimal consumption of hydrogen is desirable.

Depending on the desired composition of the total product, the amount of steam may be varied. To produce a total product that has increased amounts of gas relative to liquid, more steam may be added to the contacting zone. A weight ratio of steam to feed may range from 0.001 to 100 from 0.01 to 10, from 0.05 to 5, or from 1 to 3 depending on the properties of the feed. For liquid or semiliquid feed a steam to feed ratio may be at least 0.001, at least 0.01, at least 0.02, or at least 1. For solid and/or semisolid feed a steam to feed ratio may be at least 1, at least 2, at least 3, at least 5 or at least 10. Varying the amount of steam also changes the ratio of carbon monoxide to carbon dioxide. The ratio of carbon monoxide to carbon dioxide in the produced gas may be varied from 0.01 to 10, or from 0.02 to 6, or from 0.03 to 5, or from 1 to 4 by altering the weight ratio of steam to feed in the contacting zone. For example, by increasing the ratio of steam to feed in the contacting zone the ratio of carbon monoxide to carbon dioxide is decreased.

The ratio of hydrogen source to feed may also be altered to alter the properties of the crude product. For example, increasing the ratio of the hydrogen source to feed may result in crude product that has an increased VGO content per gram of crude product.

In some embodiments, the feed may include significant amounts of sulfur as described herein which may be converted to hydrogen sulfide during contacting of the feed using systems, method and/or catalysts described herein. The feed may also include entrained hydrogen sulfide gas prior to contacting. Sulfur, present as organo sulfur or hydrogen sulfide is known to poison and/or reduce the activity of catalysts used in processing of feeds to make commercial products. In some refinery operations, feeds are treated to remove sulfur prior to treatment to obtain commercial products such as transportation fuel, thus a sulfur resistant catalyst are desirable. A content of sulfur, measured as hydrogen sulfide, per gram of feed, ranging from about 0.00001 grams to about 0.01 grams or from about 0.0001 grams to about 0.001 grams hydrogen sulfide may poison and/or reduce the activity of conventional catalysts used for hydrotreating and/or catalytic cracking processes.

In some embodiments, contact of the feed with a hydrogen source in the presence of the inorganic salt catalyst and a sulfur-containing compound may produce a total product that includes a crude product and/or gas. The feed, in some embodiments, is contacted in the presence of hydrogen sulfide for at least 500 hours, at least 1000 hours, or at least 2000 hours without replacement of the inorganic salt catalyst. The presence of sulfur, in some embodiments, may enhance the production of carbon oxide gases (for example, carbon monoxide and carbon dioxide) when a feed is contacted with a hydrogen source and steam in the presence of sulfur containing compounds relative to contacting under the same conditions in the absence of sulfur. In some embodiments, contact of the feed with a hydrogen source in the presence of the inorganic salt catalyst and hydrogen sulfide produces a total product that has a carbon oxide gases content, per gram of feed, of at least 0.2 grams, at least 0.5 grams, at least 0.8 grams, or at least 0.9 grams of carbon oxide gases.

In certain embodiments, contact of the feed with the inorganic salt catalyst in the presence of light hydrocarbons and/or steam yields more liquid hydrocarbons and less coke in a crude product than contact of a feed with an inorganic salt catalyst in the presence of hydrogen and steam. In embodiments that include contact of the feed with methane in the presence of the inorganic salt catalyst, at least a portion of the components of the crude product may include atomic carbon and hydrogen (from the methane), which has been incorporated into the molecular structures of the components.

In certain embodiments, the volume of crude product produced from a feed contacted with the hydrogen source in the presence of the inorganic salt catalyst is at least 5% greater, at least 10% greater, or at least 15%, or at most 100% greater than a volume of crude product produced from a thermal process at STP. The total volume of crude product produced by contact of the feed with the inorganic salt catalyst may be at least 110 vol % of the volume of the feed at STP. The increase in volume is believed to be due to a decrease in density. Lower density may generally be at least partially caused by hydrogenation of the feed.

In certain embodiments, a feed having, per gram of feed, at least 0.02 grams, at least 0.05 grams, or at least 0.1 grams of sulfur, and/or at least 0.001 grams of Ni/V/Fe is contacted with a hydrogen source in the presence of an inorganic salt catalyst without diminishing the activity of the catalyst.

In some embodiments, the inorganic salt catalyst can be regenerated, at least partially, by removal of one or more components that contaminate the catalyst. Contaminants include, but are not limited to, metals, sulfides, nitrogen, coke, or mixtures thereof. Sulfide contaminants may be removed from the used inorganic salt catalyst by contacting steam and carbon dioxide with the used catalyst to produce hydrogen sulfide. Nitrogen contaminants may be removed by contacting the used inorganic salt catalyst with steam to produce ammonia. Coke contaminants may be removed from the used inorganic salt catalyst by contacting the used inorganic salt catalyst with steam and/or methane to produce hydrogen and carbon oxides. In some embodiments, one or more gases are generated from a mixture of used inorganic salt catalyst and residual feed.

In certain embodiments, a mixture of used inorganic salt catalyst (for example, a supported inorganic salt catalyst, a mixture of $ZrO_2$ and CaO, a mixture of $ZrO_2$ and MgO, $K_2CO_3/Rb_2CO_3/Cs_2CO_3$; $KOH/Al_2O_3$; $Cs_2CO_3/CaCO_3$; or $NaOH/KOH/LiOH/ZrO_2$), unreacted feed and/or residue and/or coke may be heated to a temperature in a range from about 700-1000° C. or from about 800-900° C. until the production of gas and/or liquids is minimal in the presence of steam, hydrogen, carbon dioxide, and/or light hydrocarbons to produce a liquid phase and/or gas. The gas may include an increased quantity of hydrogen and/or carbon dioxide relative to reactive gas. For example, the gas may include from about 0.1-99 moles or from about 0.2-8 moles of hydrogen and/or carbon dioxide per mole of reactive gas. The gas may contain a relatively low amount of light hydrocarbons and/or carbon monoxide. For example, less than about 0.05 grams of light hydrocarbons per gram of gas and less than about 0.01 grams of carbon monoxide per gram of gas. The liquid phase may contain water, for example, greater than 0.5-0.99 grams, or greater than 0.9-0.9 grams of water per gram of liquid.

In some embodiments, the used catalyst and/or solids in the contacting zone may be treated to recover metals (for example, vanadium and/or nickel) from the used catalyst and/or solids. The used catalyst and/or solids may be treated using generally known metal separation techniques, for example, heating, chemical treating, and/or gasification.

EXAMPLES

Non-limiting examples of catalyst preparations, testing of catalysts, and systems with controlled contacting conditions are set forth below.

Example 1

TAP Testing of a $K_2CO_3/Rb_2CO_3/Cs_2CO_3$ Catalyst and the Individual Inorganic Salts In all TAP testing, a 300 mg sample was heated in a reactor of a TAP system from room temperature (about 27° C.) to 500° C. at a rate of about 50° C. per minute. Emitted water vapor and carbon dioxide gas were monitored using a mass spectrometer of the TAP system.

The $K_2CO_3/Rb_2CO_3/Cs_2CO_3$ catalyst supported on alumina showed a current inflection of greater than 0.2 volts for emitted carbon dioxide and a current inflection of 0.01 volts for emitted water from the inorganic salt catalyst at about 360° C. The minimum TAP temperature was about 360° C., as determined by plotting the log 10 of the ion current versus temperature. FIG. 10 is a graphical representation of log 10 plots of ion current of emitted gases from the $K_2CO_3/Rb_2CO_3/Cs_2CO_3$ catalyst ("log(I)") versus temperature ("T"). Curves 232 and 234 are log 10 values for the ion currents for emitted water and $CO_2$ from the inorganic salt catalyst. Sharp inflections for emitted water and $CO_2$ from the inorganic salt catalyst occurs at about 360° C.

In contrast to the $K_2CO_3/Rb_2CO_3/Cs_2CO_3$ catalyst, potassium carbonate and cesium carbonate had non-detectable current inflections at 360° C. for both emitted water and carbon dioxide.

The substantial increase in emitted gas for the $K_2CO_3/Rb_2CO_3/Cs_2CO_3$ catalyst demonstrates that inorganic salt catalysts composed of two or more different inorganic salts may be more disordered than the individual pure carbonate salts.

Example 2

DSC Testing of an Inorganic Salt Catalyst and Individual Inorganic Salts

In all DSC testing, a 10 mg sample was heated to 520° C. at a rate of 10° C. per min, cooled from 520° C. to 0.0° C. at rate of 10° C. per minute, and then heated from 0° C. to 600° C. at a rate of 10.0° C. per min using a differential scanning calorimeter (DSC) Model DSC-7, manufactured by Perkin-Elmer (Norwalk, Conn., U.S.A.).

DSC analysis of a $K_2CO_3/Rb_2CO_3/Cs_2CO_3$ catalyst during second heating of the sample shows that the salt mixture exhibited a broad heat transition between 219° C. and 260° C. The midpoint of the temperature range was about 250° C. The area under heat transition curve was calculated to be −1.75 Joules per gram. The beginning of crystal disorder was determined to start at the minimum DSC temperature of 219° C.

In contrast to these results, no definite heat transitions were observed for cesium carbonate.

DSC analysis of a mixture of $Li_2CO_3$, $Na_2CO_3$, and $K_2CO_3$ during the second heating cycle shows that the $Li_2CO_3/Na_2CO_3/K_2CO_3$ mixture exhibited a sharp heat transition between 390° C. to 400° C. The midpoint of the temperature range was about 385° C. The area under heat transition curve was calculated to be −182 Joules per gram. The beginning of mobility is determined to start at the minimum DSC temperature of 390° C. The sharp heat transition indicates a substantially homogeneous mixture of salts.

Example 3

Ionic Conductivity Testing of an Inorganic Salt Catalysts or an Individual Inorganic Salt Relative to $K_2CO_3$ All testing was conducted by placing 3.81 cm (1.5 inches) of the inorganic salt catalysts or the individual inorganic salts in a quartz vessel with platinum or copper wires separated from each other, but immersed in the sample in a muffle furnace. The wires were connected to a 9.55 volt dry cell and a 220,000 ohm current limiting resistor. The muffle furnace was heated to 600° C. and the current was measured using a micrometer.

Figure 11:
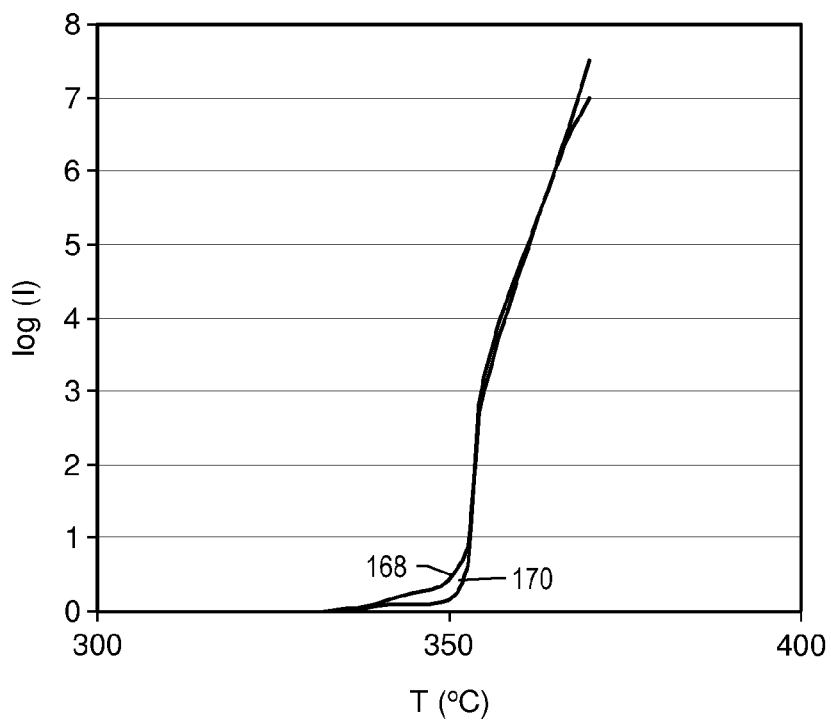
FIG. 11 is a graphic representation of log plots of the resistance of inorganic salt catalysts and an inorganic salt relative to the resistance of potassium carbonate versus temperature.

FIG. 11 is a graphical representation of log plots of the sample resistance relative to potassium carbonate resistance ("log($rK_2CO_3$)") versus temperature ("T"). Curves 240, 242, 244, 246, and 248 are log plots of $K_2CO_3$ resistance, CaO resistance, $K_2CO_3/Rb_2CO_3/Cs_2CO_3$ catalyst resistance, $Li_2CO_3/K_2CO_3/Rb_2CO_3/Cs_2CO_3$ catalyst resistance, and $Na_2CO_3/K_2CO_3/Rb_2CO_3/Cs_2CO_3$ catalyst resistance, respectively.

CaO (curve 242) exhibits relatively large stable resistance relative to $K_2CO_3$ (curve 240) at temperatures in a range between 380-500° C. A stable resistance indicates an ordered structure and/or ions that tend not to move apart from one another during heating. The $K_2CO_3/Rb_2CO_3/Cs_2CO_3$ catalyst, $Li_2CO_3/K_2CO_3/Rb_2CO_3/Cs_2CO_3$ catalyst, and $Na_2CO_3/K_2CO_3/Rb_2CO_3/Cs_2CO_3$ catalyst (see curves 244, 246, and 248) show a sharp decrease in resistivity relative to $K_2CO_3$ at temperatures in a range from 350-500° C. A decrease in resistivity generally indicates that current flow was detected during application of voltage to the wires embedded in the inorganic salt catalyst. The data from FIG. 11 demonstrate that the inorganic salt catalysts are generally more mobile than the pure inorganic salts at temperatures in a range from 350-600° C.

Figure 12:
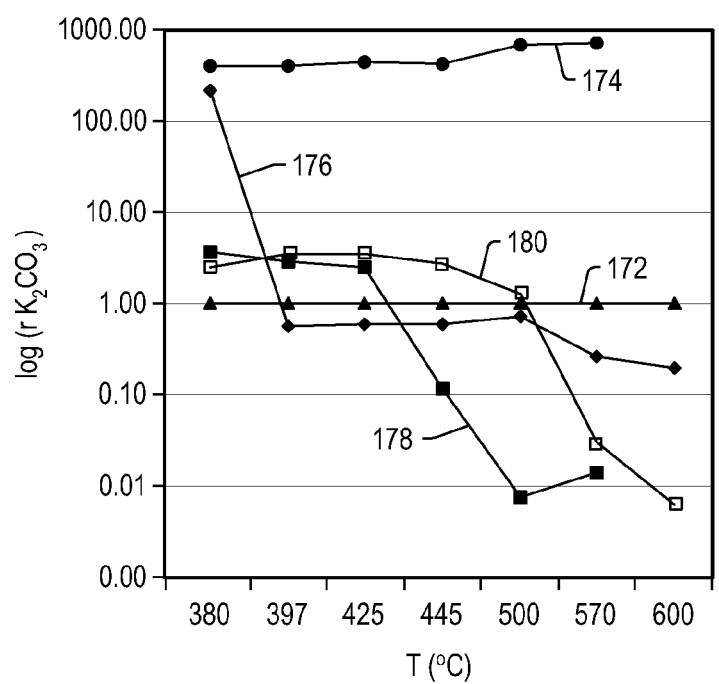
FIG. 12 is a graphic representation of log plots of the resistance of a $Na_2CO_3/K_2CO_3/Rb_2CO_3$ catalyst relative to resistance of the potassium carbonate versus temperature.

FIG. 12 is a graphical representation of log plots of $Na_2CO_3/K_2CO_3/Rb_2CO_3/Cs_2CO_3$ catalyst resistance relative to $K_2CO_3$ resistance ("log($rK_2CO_3$)") versus temperature ("T"). Curve 250 is a plot of a ratio of $Na_2CO_3/K_2CO_3/Rb_2CO_3/Cs_2CO_3$ catalyst resistance relative to $K_2CO_3$ resistance (curve 240) versus temperature during heating of the $Na_2CO_3/K_2CO_3/Rb_2CO_3/Cs_2CO_3$ catalyst. After heating, the $Na_2CO_3/K_2CO_3/Rb_2CO_3/Cs_2CO_3$ catalyst was cooled to room temperature and then heated in the conductivity apparatus. Curve 252 is a log plot of $Na_2CO_3/K_2CO_3/Rb_2CO_3/Cs_2CO_3$ catalyst resistance relative to $K_2CO_3$ resistance versus temperature during heating of the inorganic salt catalyst after being cooled from 600° C. to 25° C. The ionic conductivity of the reheated $Na_2CO_3/K_2CO_3/Rb_2CO_3/Cs_2CO_3$ catalyst increased relative to the ionic conductivity of the original $Na_2CO_3/K_2CO_3/Rb_2CO_3/Cs_2CO_3$ catalyst.

From the difference in ionic conductivities of the inorganic salt catalyst during the first heating and second heating, it may be inferred that the inorganic salt catalyst forms a different form (a second form) upon cooling that is not the same as the form (a first form) before any heating.

Example 4

Flow Property Testing of an Inorganic Salt Catalyst

A 1-2 cm thick layer of powdered $K_2CO_3/Rb_2CO_3/Cs_2CO_3$ catalyst was placed in a quartz dish. The dish was placed in a furnace and heated to 500° C. for about 1 hour. To determine flow properties of the catalyst, the dish was manually tilted in the oven after heating. The $K_2CO_3/Rb_2CO_3/Cs_2CO_3$ catalyst did not flow. When pressed with a spatula, the catalyst had a consistency of taffy.

In contrast, the individual carbonate salts were free flowing powders under the same conditions.

A $Na_2CO_3/K_2CO_3/Rb_2CO_3/Cs_2CO_3$ catalyst became liquid and readily flowed (similar, for example, to water) in the dish under the same conditions.

Examples 5 and 6

Contact of a Feed with a Hydrogen Source in the Presence of a $K_2CO_3/Rb_2CO_3/Cs_2CO_3$ Catalyst and Steam The following equipment and general procedure was used in Examples 5-23 except where variations are described. Reactor: A 250 mL Hastelloy C Parr Autoclave (Parr Model #4576) rated at 35 MPa working pressure (5000 psi) at 500° C., was fitted with a mechanical stirrer and an 800 watt Gaumer band heater on a Eurotherm controller capable of maintaining the autoclave at ±5° C. from ambient to 625° C., a gas inlet port, a steam inlet port, one outlet port, and a thermocouple to register internal temperature. Prior to heating, the top of the autoclave was insulated with glass cloth.

Addition Vessel: An addition vessel (a 250 mL, 316 stainless steel hoke vessel) was equipped with a controlled heating system, suitable gas control valving, a pressure relief device, thermocouples, a pressure gauge, and a high temperature control valve (Swagelok Valve # SS-4UW) capable of regulating flow of a hot, viscous, and/or pressurized feed at a flow rate from 0-500 g/min. An outlet side of the high temperature control valve was attached to the first inlet port of the reactor after feed was charged to the addition vessel. Prior to use, the addition vessel line was insulated.

Product Collection: Vapor from the reactor exited the outlet port of the reactor and was introduced into a series of cold traps of decreasing temperatures (dip tubes connected to a series of 150 mL, 316 stainless steel hoke vessels). Liquid from the vapor was condensed in the cold traps to form a gas stream and a liquid condensate stream. Flow rate of the vapor from the reactor and through the cold traps was regulated, as needed, using a back pressure regulator. A rate of flow and a total gas volume for the gas stream exiting the cold traps were measured using a wet test meter (Ritter Model # TG 05 Wet Test Meter). After exiting the wet test meter, the gas stream was collected in a gas bag (a Tedlar gas collection bag) for analysis. The gas was analyzed using GC/MS (Hewlett-Packard Model 5890, now Agilent Model 5890; manufactured by Agilent Technologies, Zion Ill., U.S.A.). The liquid condensate stream was removed from the cold traps and weighed. Crude product and water were separated from the liquid condensate stream. The crude product was weighed and analyzed.

Procedure: Cerro Negro (137.5 grams) was charged to the addition vessel. The feed had an API gravity of 6.7. The feed had, per gram of feed, a sulfur content of 0.042 grams, a nitrogen content of 0.011 grams, and a total Ni/V content of 0.009 grams. The feed was heated to 150° C. The $K_2CO_3/Rb_2CO_3/Cs_2CO_3$ catalyst (31.39 grams) was charged to the reactor.

The $K_2CO_3/Rb_2CO_3/Cs_2CO_3$ catalyst was prepared by combining of 16.44 grams of $K_2CO_3$, 19.44 grams of $Rb_2CO_3$, and 24.49 grams of $Cs_2CO_3$. The $K_2CO_3/Rb_2CO_3/Cs_2CO_3$ catalyst had a minimum TAP temperature of 360° C. The $K_2CO_3/Rb_2CO_3/Cs_2CO_3$ catalyst had a DSC temperature of 250° C. The individual salts ($K_2CO_3$, $Rb_2CO_3$, and $Cs_2CO_3$) did not exhibit DSC temperatures in a range from 50-500° C. This TAP temperature is above the DSC temperature of the inorganic salt catalyst and below the DSC temperature of the individual metal carbonates.

The catalyst was heated rapidly to 450° C. under an atmospheric pressure flow of methane of 250 $cm^3$/min. After reaching the desired reaction temperature, steam at a rate of 0.4 mL/min, and methane at rate of 250 $cm^3$/min, was metered to the reactor. The steam and methane were continuously metered during the addition of the feed to the reactor over about 2.6 hours. The feed was pressurized into the reactor using 1.5 MPa (229 psi) of $CH_4$ over 16 minutes. Residual feed (0.56 grams) remained in the addition vessel after the addition of the feed was complete. A decrease in temperature to 370° C. was observed during the addition of the feed.

The catalyst/feed mixture was heated to a reaction temperature of 450° C. and maintained at that temperature for about 2 hours. After two hours, the reactor was cooled and the resulting residue/catalyst mixture was weighed to determine a percentage of coke produced and/or not consumed in the reaction.

From a difference in initial catalyst weight and coke/catalyst mixture weight, 0.046 grams of coke remained in the reactor per gram of feed. The total product included 0.87 grams of a crude product with an average API gravity of 13 and gas. The gas included unreacted $CH_4$, hydrogen, $C_2$ and $C_4$-$C_6$ hydrocarbons, and $CO_2$ (0.08 grams of $CO_2$ per gram of gas).

The crude product had, per gram of crude product, 0.01 grams of sulfur and 0.000005 grams of a total Ni and V. The crude product was not further analyzed.

In Example 6, the reaction procedures, conditions, feed, and catalyst were the same as in Example 5. The crude product of Example 6 was analyzed to determine boiling range distributions for the crude product. The crude product had, per gram of crude product, 0.14 grams of naphtha, 0.19 grams of distillate, 0.45 grams of VGO, and residue content of 0.001 grams, and non-detectable amounts of coke.

Examples 5 and 6 demonstrate that contact of the feed with a hydrogen source in the presence of at most 3 grams of catalyst per 100 grams of feed produces a total product that includes a crude product that is a liquid mixture at STP. The crude product had a residue content of at most 30% of the residue content of the feed. The crude product had a sulfur content and total Ni/V content of at most 90% of the sulfur content and Ni/V content of the feed.

The crude product included at least 0.001 grams of hydrocarbons with a boiling range distribution of at most 200° C. at 0.101 MPa, at least 0.001 grams of hydrocarbons with a boiling range distribution between 200-300° C. at 0.101 MPa, at least 0.001 grams of hydrocarbons with a boiling range distribution between 400-538° C. (1000° F.) at 0.101 MPa.

Examples 7-8

Figure 13:
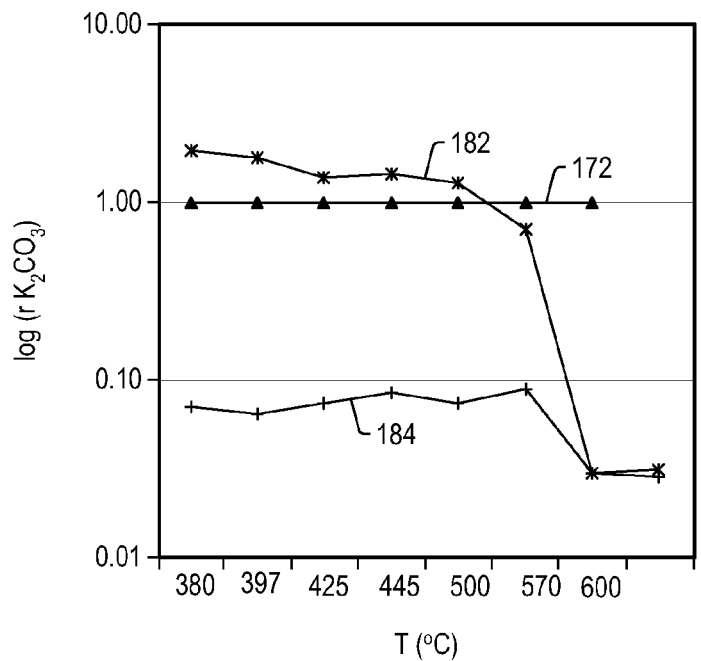
FIG. 13 is a graphical representation of weight percent of coke, liquid hydrocarbons, and gas versus various hydrogen sources produced from embodiments of contacting the feed with the inorganic salt catalyst.

Contact of a Feed with a Hydrogen Source in the Presence of the $K_2CO_3$/$Rb_2CO_2$/$Cs_2CO_3$ Catalyst and Steam The reaction procedures, conditions, and the $K_2CO_3$/$Rb_2CO_3$/$Cs_2CO_3$ catalyst in Examples 7 and 8 were the same as in Example 5, except that 130 grams of feed (Cerro Negro) and 60 grams of the $K_2CO_3$/$Rb_2CO_3$/$Cs_2CO_3$ catalyst were used. In Example 7, methane was used as the hydrogen source. In Example 8, hydrogen gas was used as the hydrogen source. A graphical representation of the amounts of non-condensable gas, crude product, and coke is depicted in FIG. 13. Bars 254 and 256 represent wt % coke produced, bars 258 and 260 represent wt % liquid hydrocarbons produced, and bars 262 and 264 represent wt % gas produced, based on the weight of the feed.

In Example 7, 93 wt % of crude product (bar 260), 3 wt % of gas (bar 264), and 4 wt % of coke (bar 256), based on the weight of the Cerro Negro, was produced.

In Example 8, 84 wt % of crude product (bar 258), 7 wt % of gas (bar 262), and 9 wt % of coke were produced (bar 254), based on the weight of the Cerro Negro.

Examples 7 and 8 provide a comparison of the use of methane as a hydrogen source to the use of hydrogen gas as a hydrogen source. Methane is generally less expensive to produce and/or transport than hydrogen, thus a process that utilizes methane is desirable. As demonstrated, methane is at least as effective as hydrogen gas as a hydrogen source when contacting a feed in the presence of an inorganic salt catalyst to produce a total product.

Examples 9-10

Producing a Crude Product with Selected API Gravity

The apparatus, reaction procedure and the inorganic salt catalyst were the same as in Example 5, except that the reactor pressure was varied.

Figure 14:
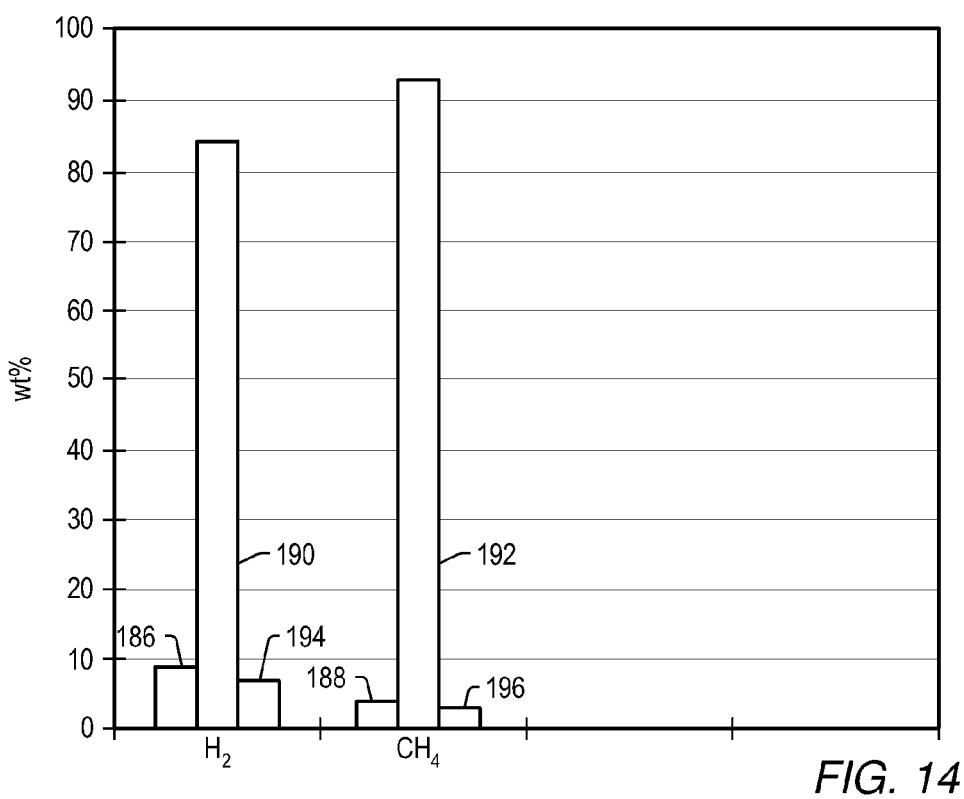
FIG. 14 is a graphical representation of weight percentage versus carbon number of crude products produced from embodiments of contacting the feed with the inorganic salt catalyst.

Example 9, the reactor pressure was 0.1 MPa (14.7 psi) during the contacting period. A crude product with API gravity of 25 at 15.5° C. was produced. The total product had hydrocarbons with a distribution of carbon numbers in a range from 5 to 32 (see curve 266 in FIG. 14).

In Example 10, the reactor pressure was 3.4 MPa (514.7 psi) during the contacting period. A crude product with API gravity of 51.6 at 15.5° C. was produced. The total product had hydrocarbons with a distribution of carbon numbers in a range from 5 to 15 (see curve 268 in FIG. 12).

These examples demonstrate methods for contacting the feed with hydrogen in the presence of an inorganic salt catalyst at various pressures to produce a crude product with a selected API gravity. By varying the pressure, a crude product with a higher or lower API gravity was produced.

Examples 11-12

Contact of a Feed in the Presence of a $K_2CO_3$/$Rb_2CO_3$/$Cs_2CO_3$ Catalyst or Silicon Carbide in the Absence of an External Hydrogen Source In Examples 11 and 12, the apparatus, feed, and reaction procedure were the same as in Example 5, except that the feed and catalyst (or silicon carbide) were directly charged into the reactor at the same time. Carbon dioxide ($CO_2$) was used as a carrier gas. In Example 11, 138 grams of Cerro Negro was combined with 60.4 grams of the $K_2CO_3$/$Rb_2CO_3$/$Cs_2CO_3$ catalyst (same catalyst as in Example 5). In Example 12, 132 g of Cerro Negro was combined with 83.13 grams of silicon carbide (40 mesh, Stanford Materials; Aliso Viejo, Calif.). Such silicon carbide is believed to have low, if any, catalytic properties under the process conditions described herein.

In each example, the mixture was heated to a reaction temperature of 500° C. over a period of about 2 hours. The $CO_2$ was metered into the reactor at a rate of 100 cm³/min. Vapor generated from the reactor was collected in the cold traps and a gas bag using a back pressure of about 3.2 MPa (479.7 psi). Crude product from the cold traps was consolidated and analyzed.

In Example 11, 36.82 grams (26.68 wt %, based on the weight of the feed) of a colorless hydrocarbon liquid with API gravity of at least 50 was produced from contact of the feed with the inorganic salt catalyst in the carbon dioxide atmosphere.

In Example 12, 15.78 grams (11.95 wt %, based on the weight of the feed) of a yellow hydrocarbon liquid with an API gravity of 12 was produced from contact of the feed with silicon carbide in the carbon dioxide atmosphere.

Although the yield in Example 11 is low, the in-situ generation of a hydrogen source in the presence of the inorganic salt catalyst is greater than the in-situ generation of hydrogen under non-catalytic conditions. The yield of crude product in Example 12 is one-half of the yield of crude product in Example 11. Example 11 also demonstrates that hydrogen is generated during contact of the feed in the presence of the inorganic salt and in the absence of a gaseous hydrogen source.

Examples 13-16

Contact of a Feed with a Hydrogen Source in the Presence of $K_2CO_3$/$Rb_2CO_3$/$Cs_2CO_3$ Catalyst, Calcium Carbonate, and Silicon Carbide at Atmospheric Conditions The apparatus, reaction procedure, feed and the inorganic salt catalyst were the same as in Example 5, except that the Cerro Negro was added directly to the reactor instead of addition through the addition vessel and hydrogen gas was used as the hydrogen source. The reactor pressure was 0.101 MPa (14.7 psi) during the contacting period. The hydrogen gas flow rate was 250 cm$^3$/min. Reaction temperatures, steam flow rates, and percentages of crude product, gas, and coke produced are tabulated in Table 1 in FIG. 15.

In Examples 13 and 14, the $K_2CO_3/Rb_2CO_3/Cs_2CO_3$ catalyst was used. In Example 13, the contacting temperature was 375° C. In Example 14, the contacting temperature was in a temperature range from 500-600° C.

As shown in Table 1 (FIG. 15), for Examples 13 and 14, when the temperature was increased from 375° C. to 500° C., production of gas increased from 0.02 grams to 0.05 grams of gas per gram of total product. Coke production, however, decreased from 0.17 grams to 0.09 grams of coke per gram of feed at the higher temperature. The sulfur content of the crude product also decreased from 0.01 grams to 0.008 grams of sulfur per gram of crude product at the higher temperature. Both crude products had atomic H/C of 1.8.

In Example 15, a feed was contacted with $CaCO_3$ under conditions similar to the conditions described for Example 14. Percentages of crude product, gas, and coke production are tabulated in Table 1 in FIG. 13. Gas production increased in Example 15 relative to the gas production in Example 14. Desulfurization of the feed was not as effective as in Example 14. The crude product produced in Example 15 had, per gram of crude product, 0.01 grams of sulfur as compared to the sulfur content of 0.008 grams per gram of crude product for the crude product produced in Example 14.

Example 16 is a comparative example for Example 14. In Example 16, 83.13 grams of silicon carbide instead of the inorganic salt catalyst was charged to the reactor. Gas production and coke production significantly increased in Example 16 relative to the gas production and coke production in Example 14. Under these non-catalytic conditions, 0.22 grams of coke per gram of crude product, 0.25 grams of non-condensable gas, and 0.5 grams of crude product were produced. The crude product produced in Example 16 had 0.036 grams of sulfur per gram of crude product, compared to of 0.01 grams of sulfur per gram of crude product produced in Example 14.

These examples demonstrated that the catalysts used in Examples 13 and 14 provide improved results over non-catalytic conditions and conventional metal salts. At 500° C., and a hydrogen flow rate of 250 cm$^3$/min, the amounts of coke and non-condensable gas were significantly lower than the amounts of coke and of non-condensable gas produced under non-catalytic conditions.

Figure 15:
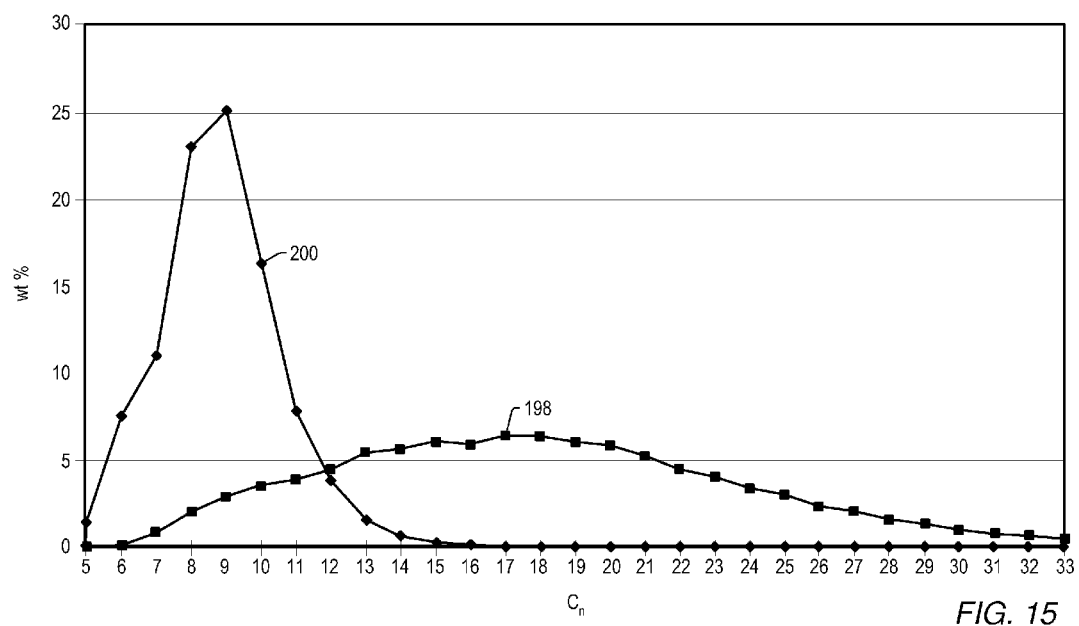
FIG. 15 is a tabulation of components produced from embodiments of contacting the feed with inorganic salt catalysts, a metal salt, or silicon carbide.

In examples using inorganic salt catalysts (See Examples 13-14 in Table 1, FIG. 15), a decrease was observed in the weight percent of produced gas relative to the produced gas formed during the control experiment (for example, Example 16 in Table 1, FIG. 15). From the quantity of hydrocarbons in the produced gas, the thermal cracking of the feed is estimated to be at most 20 wt %, at most 15 wt %, at most 10 wt %, at most 5 wt %, or none, based on the total amount of feed contacted with a hydrogen source.

Examples 17 and 18

Contact of a Feed with a Gaseous Hydrogen Source in the Presence of Water and a $K_2CO_3/Rb_2CO_3/Cs_2CO_3$ Catalyst or Silicon Carbide Apparatus in Examples 17 and 18 were the same as in Example 5 except that hydrogen gas was used as the hydrogen source. In Example 17, 130.4 grams of Cerro Negro was combined with 30.88 grams of the $K_2CO_3/Rb_2CO_3/Cs_2CO_3$ catalyst to form a feed mixture. In Example 18, 139.6 grams of Cerro Negro was combined with 80.14 grams of silicon carbide to form the feed mixture.

The feed mixture was charged directly into the reactor. The hydrogen gas was metered at 250 cm$^3$/min into the reactor during the heating and holding periods. The feed mixture was heated to 300° C. over about 1.5 hours and maintained at 300° C. for about 1 hour. The reaction temperature was increased to 400° C. over about 1 hour and maintained at 400° C. for about 1 hour. After the reaction temperature reached 400° C., water was introduced into the reactor at a rate of 0.4 g/min in combination with the hydrogen gas. Water and hydrogen were metered into the reactor for the remaining heating and holding periods. After maintaining the reaction mixture at 400° C., the reaction temperature was increased to 500° C. and maintained at 500° C. for about 2 hours. Generated vapor from the reactor was collected in the cold traps and a gas bag. Liquid product from the cold traps was consolidated and analyzed.

In Example 17, 86.17 grams (66.1 wt %, based on the weight of the feed) of a dark reddish brown hydrocarbon liquid (crude product) and water (97.5 g) were produced as a vapor from contact of the feed with the $K_2CO_3/Rb_2CO_3/Cs_2CO_3$ catalyst in the hydrogen atmosphere.

In Example 18, water vapor and a small amount of gas was produced from the reactor. The reactor was inspected, and a dark brown viscous hydrocarbon liquid was removed from the reactor. Less than 50 wt % of the dark brown viscous liquid was produced from contact of the feed with silicon carbide in the hydrogen atmosphere. A 25% increase in yield of crude product was observed in Example 17 relative to a yield of crude product produced in Example 18.

Example 17 demonstrates an improvement of the properties of the crude product produced using methods described herein relative to a crude product produced using hot water. Specifically, the crude product in Example 17 was lower boiling than the crude product from Example 18, as demonstrated by the crude product produced in Example 18 not being able to be produced as a vapor. The crude product produced in Example 17 had enhanced flow properties relative to the crude product produced in Example 18, as determined by visual inspection.

Examples 19-20

Contact of a Feed with a Hydrogen Source in the Presence of a $K_2CO_3/Rb_2CO_2/Cs_2CO_3$ Catalyst to Produce a Crude Product with Increased Volume Relative to a Crude Product Volume Produced Under Non-Catalytic Conditions The apparatus, feed, inorganic catalyst, and reaction procedure was the same as described in Example 5, except the feed was directly charged to the reactor and hydrogen gas was used as the hydrogen source. The feed (Cerro Negro) had an API gravity 6.7 and a density of 1.02 g/mL at 15.5° C.

In Example 19, 102 grams of the feed (about 100 mL of feed) and 31 grams of $K_2CO_3/Rb_2CO_3/Cs_2CO_3$ catalyst were charged to the reactor. A crude product (87.6 grams) with an API gravity of 50 and a density of 0.7796 g/mL at 15.5° C. (112 mL) was produced.

In Example 20, 102 grams of feed (about 100 mL of feed) and 80 grams of silicon carbide were charged to the reactor. A crude product (70 grams) of with an API gravity of 12 and a density of 0.9861 g/mL at 15.5° C. (about 70 mL) was produced.

Under these conditions, the volume of the crude product produced from Example 19 was approximately 10% greater than the volume of the feed. The volume of the crude product produced in Example 20 was significantly less (40% less) than the volume of crude product produced in Example 19. A significant increase in volume of product enhances a producer's ability to generate more volume of crude product per volume of input crude.

Example 21

Contact of a Feed with a Hydrogen Source in the Presence of a $K_2CO_3/Rb_2CO_3/Cs_2CO_3$ Catalyst, Sulfur, and Coke The apparatus and reaction procedure were the same as in Example 5, except that the steam was metered into the reactor at 300 cm³/min. The $K_2CO_3/Rb_2CO_3/Cs_2CO_3$ catalyst was prepared by combining 27.2 grams of $K_2CO_3$, 32.2 grams of $Rb_2CO_3$ and 40.6 grams of $Cs_2CO_3$.

The feed (130.35 grams) and $K_2CO_3/Rb_2CO_3/Cs_2CO_3$ catalyst (31.6 grams) was charged to the reactor. The Cerro Negro crude included, per gram of feed, 0.04 grams total aromatics content in a boiling range distribution between 149-260° C. (300-500° F.), 0.000640 grams of nickel and vanadium combined, 0.042 grams of sulfur, and 0.56 grams of residue. API gravity of the feed was 6.7.

Contact of the feed with methane in the presence of the $K_2CO_3/Rb_2CO_3/Cs_2CO_3$ catalyst produced, per gram of feed, 0.95 grams of total product, and 0.041 grams of coke.

The total product included, per gram of total product, 0.91 grams of crude product and 0.028 grams of hydrocarbon gas. The total gas collected included, per mole of gas, 0.16 moles of hydrogen, 0.045 moles of carbon dioxide, and 0.025 moles of $C_2$ and $C_4$-$C_6$ hydrocarbons, as determined by GC/MS. The balance of the gas was methane, air, carbon monoxide, and a trace (0.004 moles) of evaporated crude product.

The crude product was analyzed using a combination of gas chromatography and mass spectrometry. The crude product included a mixture of hydrocarbons with a boiling range between 100-538° C. The total liquid product mixture included 0.006 grams ethyl benzene (a monocyclic ring compound with a boiling point of 136.2° C. at 0.101 MPa) per gram of mixture. This product was not detected in the feed.

The used catalyst ("first used catalyst") was removed from the reactor, weighed, and then analyzed. The first used catalyst had an increase in weight from 31.6 grams to a total weight of 37.38 grams (an increase of 18 wt %, based on the weight of the original $K_2CO_3/Rb_2CO_3/Cs_2CO_3$ catalyst). The first used catalyst included 0.15 grams of additional coke, 0.0035 grams of sulfur, 0.0014 grams of Ni/V, and 0.845 grams of $K_2CO_3/Rb_2CO_3/Cs_2CO_3$ per gram of used catalyst.

Additional feed (152.71 grams) was contacted with the first used catalyst (36.63 grams) to produce 150 grams of recovered total product after losses. The total product included, per gram of total product, 0.92 grams of liquid crude product, 0.058 grams of additional coke, and 0.017 grams of gas. The gas included, per mole of gas, 0.18 moles of hydrogen, 0.07 grams of carbon dioxide, and 0.035 moles of $C_2$-$C_6$ hydrocarbons. The balance of the gas was methane, nitrogen, some air, and traces of evaporated oil product (<1% mole).

The crude product included a mixture of hydrocarbons with a boiling range between 100-538° C. The portion of the mixture with a boiling range distribution below 149° C. included, per mole of total liquid hydrocarbons, 0.018 mole % of ethyl benzene, 0.04 mole % of toluene, 0.03 mole % of meta-xylene, and 0.060 mole % of para-xylene (monocyclic ring compounds with a boiling points below 149° C. at 0.101 MPa). These products were not detectable in the feed.

The used catalyst ("second used catalyst") was removed from the reactor, weighed, and then analyzed. The second used catalyst had an increase in weight from 36.63 grams to a total weight of 45.44 grams (an increase of 43 wt %, based on the weight of the original $K_2CO_3/Rb_2CO_3/Cs_2CO_3$ catalyst). The second used catalyst included 0.32 grams of coke, and 0.01 grams of sulfur, and 0.67 grams per gram of second used catalyst.

Additional feed (104 grams) was contacted with the second used catalyst (44.84 grams) to produce, per gram of feed, 104 grams of total product and 0.114 grams of coke was collected. A portion of the coke was attributed to coke formation in the addition vessel due to overheating the addition vessel since 104.1 grams of the 133 grams of feed transferred was feed.

The total product included, per gram of total product, 0.86 grams of crude product and 0.025 grams of hydrocarbon gas. The total gas included, per mole of gas, 0.18 moles of hydrogen, 0.052 moles of carbon dioxide, and 0.03 moles of $C_2$-$C_6$ hydrocarbons. The balance of the gas was methane, air, carbon monoxide, hydrogen sulfide, and a small trace of evaporated oil.

The crude product included a mixture of hydrocarbons with a boiling range between 100-538° C. The portion of the mixture with a boiling range distribution below 149° C. included, per gram of hydrocarbon mixture, 0.021 grams ethyl benzene, 0.027 grams of toluene, 0.042 grams of meta-xylene, and 0.020 grams of para-xylene, determined as before by GC/MS.

The used catalyst ("third used catalyst") was removed from the reactor, weighed, and then analyzed. The third used catalyst had an increase in weight from 44.84 grams to a total weight of 56.59 grams (an increase of 79 wt %, based on the weight of the original $K_2CO_3/Rb_2CO_3/Cs_2CO_3$ catalyst). Detailed elemental analysis of the third used catalyst was performed. The third used catalyst included, per gram of additional matter, 0.90 grams of carbon, 0.028 grams of hydrogen, 0.0025 grams of oxygen, 0.046 grams of sulfur, 0.017 grams of nitrogen, 0.0018 grams of vanadium, 0.0007 grams of nickel, 0.0015 grams of iron, and 0.00025 grams of chloride with the balance being other transition metals such as chromium, titanium, and zirconium.

As demonstrated in this example, coke, sulfur, and/or metals deposited on and/or in the inorganic salt catalyst do not affect the overall yield of crude product (at least 80% for each run) produced by contact of a feed with a hydrogen source in the presence of the inorganic salt catalyst. The crude product had a monocyclic aromatics content at least 100 times the monocyclic ring aromatics content of the feed in a boiling range distribution below 149° C.

For the three runs, the average crude product yield (based on the weight of the feed) was 89.7 wt %, with a standard deviation of 2.6%; the average coke yield was 7.5 wt % (based on the weight of the feed), with a standard deviation of 2.7%, and the average weight yield of gaseous cracked hydrocarbons was 2.3 wt % (based on the weight of the feed) with a standard deviation of 0.46%. The comparatively large standard deviation of both liquid and coke was due to the third trial, in which the temperature controller of the feed vessel failed, overheating the feed in the addition vessel. Even so, there is no apparent significant deleterious effect of even the large amounts of coke tested here on the activity of the catalyst system.

The ratio of $C_2$ olefins to total $C_2$ was 0.19. The ratio of $C_3$ olefin to total $C_3$ was 0.4. The alpha olefins to internal olefins ratio of the $C_4$ hydrocarbons was 0.61. The $C_4$ cis/trans olefins ratio was 6.34. This ratio was substantially higher than the predicted thermodynamic $C_4$ cis/trans olefins ratio of 0.68. The alpha olefins to internal olefins ratio of the $C_5$ hydrocarbons was 0.92. This ratio was greater than the predicted thermodynamic $C_5$ alpha olefins to $C_5$ internal olefins ratio of 0.194. The $C_5$ cis/trans olefins ratio was 1.25. This ratio was greater than the predicted thermodynamic $C_5$ cis/trans olefins ratio of 0.9.

Example 22

Contact of a Relatively High Sulfur Containing Feed with a Hydrogen Source in the Presence of the $K_2CO_3/Rb_2CO_3/Cs_2CO_3$ Catalyst The apparatus and reaction procedure were the same as described in Example 5, except that the feed, methane, and steam were continuously fed to the reactor. The level of feed in the reactor was monitored using a change in weight of the reactor. Methane gas was continuously metered at 500 cm$^3$/min to the reactor. Steam was continuously metered at 6 g/min to the reactor.

The inorganic salt catalyst was prepared by combining 27.2 grams of $K_2CO_3$, 32.2 grams of $Rb_2CO_3$ and 40.6 grams of $Cs_2CO_3$. The $K_2CO_3/Rb_2CO_3/Cs_2CO_3$ catalyst (59.88 grams) was charged to the reactor.

A feed (bitumen, Lloydminster, Canada) having an API gravity of 9.4, a sulfur content of 0.02 grams of sulfur, and a residue content of 0.40 grams, per gram of feed, was heated in the addition vessel to 150° C. The hot bitumen was continuously metered from the addition vessel at 10.5 g/min to the reactor in an attempt to maintain the feed liquid level of 50% of the reactor volume, however, the rate was insufficient to maintain that level.

The methane/steam/feed was contacted with the catalyst at an average internal reactor temperature of 456° C. Contacting of the methane/steam/feed with the catalyst produced a total product (in this example in the form of the reactor effluent vapor).

A total of 1640 grams of feed was processed over 6 hours. From a difference in initial catalyst weight and residue/catalyst mixture weight, 0.085 grams of coke per gram of feed remained in the reactor. From contact of the feed with the methane in the presence of the $K_2CO_3/Rb_2CO_3/Cs_2CO_3$ catalyst, 0.93 grams of total product per gram of feed was produced. The total product included, per gram of total product, 0.03 grams of gas and 0.97 grams of crude product, excluding the amount of methane and water used in the reaction.

The gas included, per gram of gas, 0.014 grams of hydrogen, 0.018 grams of carbon monoxide, 0.08 grams of carbon dioxide, 0.13 grams of hydrogen sulfide, and 0.68 grams of non-condensable hydrocarbons. From the amount of hydrogen sulfide generated, it may be estimated that the sulfur content of the feed was reduced by 18 wt %. As shown in this example, hydrogen, carbon monoxide, and carbon dioxide were produced. The molar ratio of carbon monoxide to carbon dioxide was 0.4.

The $C_2$-$C_5$ hydrocarbons included, per gram of hydrocarbons, 0.30 grams of $C_2$ compounds, 0.32 grams of $C_3$ compounds, 0.26 grams of $C_4$ compounds, and 0.10 grams of $C_5$ compounds. The weight ratio of iso-pentane to n-pentane in the non-condensable hydrocarbons was 0.3. The weight ratio of isobutane to n-butane in the non-condensable hydrocarbons was 0.189. The $C_4$ compounds had, per gram of $C_4$ compounds, a butadiene content of 0.003 grams. A weight ratio of alpha $C_4$ olefins to internal $C_4$ olefins was 0.75. A weight ratio of alpha $C_5$ olefins to internal $C_5$ olefins was 1.08.

The data in Example 25 demonstrates that continuous processing of a relatively high sulfur feed with the same catalyst in the presence of coke did not diminish the activity of the inorganic salt catalyst, and produced a crude product suitable for transportation.

Example 23

Contact of a Feed with a Hydrogen Source in the Presence of a $K_2CO_3/Rb_2CO_3/Cs_2CO_3$ Catalyst and Coke The apparatus and reaction procedure was performed using conditions as described in Example 22. The $K_2CO_3/Rb_2CO_3/Cs_2CO_3$ catalyst (56.5 grams) was charged to the reactor. A total of 2550 grams of feed was processed over 6 hours. From a difference in initial catalyst weight and residue/catalyst mixture weight, 0.114 grams of coke per gram of feed remained in the reactor, based on the weight of the feed. A total of 0.89 grams of total product per gram of feed was produced. The total product included, per gram of total product, 0.04 grams of gas and 0.96 grams of crude product, excluding the amount of methane and water used in the reaction.

The gas included, per gram of gas, 0.021 grams of hydrogen, 0.018 grams of carbon monoxide, 0.052 grams of carbon dioxide, 0.18 grams of hydrogen sulfide, and 0.65 grams of non-condensable hydrocarbons. From the amount of hydrogen sulfide produced, it may be estimated that the sulfur content of the feed was reduced by 14 wt %, based on the weight of the feed. As shown in this example, hydrogen, carbon monoxide, and carbon dioxide were produced. The molar ratio of carbon monoxide to carbon dioxide was 0.6.

The $C_2$-$C_6$ hydrocarbons included, per gram of $C_2$-$C_6$ hydrocarbons, 0.44 grams of $C_2$ compounds, 0.31 grams of $C_3$ compounds, 0.19 grams of $C_4$ compound and 0.068 grams of $C_5$ compounds. The weight ratio of iso-pentane to n-pentane in the non-condensable hydrocarbons was 0.25. The weight ratio of iso-butane to n-butane in the non-condensable hydrocarbons was 0.15. The $C_4$ compounds had, per gram of $C_4$ compounds, a butadiene content of 0.003 grams.

This example demonstrates that repeated processing of the a relatively high sulfur feed (2550 grams of feed) with the same catalyst (56.5 grams) in the presence of coke did not diminish the activity of the inorganic salt catalyst, and produced a crude product suitable for transportation.

Example 24

Contact of a Feed with a Hydrogen Source in the Presence of $CaO/ZrO_2$ Catalyst to Produce a Total Product The following reactor and conditions were used for Examples 24-27.
Reactor: A 250 mL Hastelloy C Parr Autoclave (Parr Model #4576) rated at 35 MPa working pressure (5000 psi) at 500° C., was fitted with a mechanical stirrer and an 800 watt Gaumer band heater on a Eurotherm controller capable of maintaining the autoclave at ±5° C. from ambient to 625° C., a gas inlet port, a steam inlet port, one outlet port, and a thermocouple to register internal temperature. Prior to heating, the top of the autoclave was insulated with glass cloth. The reactor includes a screen with openings having a diameter of less than 16 mesh.

Addition Vessel: An addition vessel (a 250 mL, 316 stainless steel hoke vessel) was equipped with a controlled heating system, suitable gas control valving, a pressure relief device, thermocouples, a pressure gauge, and a high temperature control valve (Swagelok Valve # SS-4UW) capable of regulating flow of a hot, viscous, and/or pressurized feed at a flow rate from 0-500 g/min. An outlet side of the high temperature control valve was attached to the first inlet port of the reactor after feed was charged to the addition vessel. Prior to use, the addition vessel line was insulated.

Product Collection: Vapor from the reactor exited the outlet port of the reactor and was introduced into a series of cold traps of decreasing temperatures (dip tubes connected to a series of 150 mL, 316 stainless steel hoke vessels). Liquid from the vapor was condensed in the cold traps to form a gas stream and a liquid condensate stream. Flow rate of the vapor from the reactor and through the cold traps was regulated, as needed, using a back pressure regulator. A rate of flow and a total gas volume for the gas stream exiting the cold traps were measured using a wet test meter (Ritter Model # TG 05 Wet Test Meter). After exiting the wet test meter, the gas stream was collected in a gas bag (a Tedlar gas collection bag) for analysis. The gas was analyzed using GC/MS (Hewlett-Packard Model 5890, now Agilent Model 5890; manufactured by Agilent Technologies, Zion Ill., U.S.A.). The liquid condensate stream was removed from the cold traps and weighed. Crude product and water were separated from the liquid condensate stream. The crude product was weighed and analyzed.

Procedure: $ZrO_2$ (8.5 grams) was positioned on the screen in the reactor. The reactor was weighed to obtain an initial weight. Feed (asphaltenes, 5.01 grams) was charged to the addition vessel. The feed was obtained from deasphalting heavy oil. The feed had a density of 1.04 g/cc and a softening point of 200° C. The feed had, per gram of feed, 0.0374 grams of sulfur and 0.0124 grams of nitrogen.

The feed was heated to 150° C. A mixture of CaO (15.03 grams, 0.26 moles) and $ZrO_2$ (20.05 grams, 0.16 moles) were added to the feed to produce an inorganic salt catalyst/catalyst support/feed mixture. The resulting mixture catalyst was metered to the reactor vessel over 20 minutes (a calculated WHSV of 0.8 $h^{-1}$) to maintain the feed liquid level of 50% of the reactor volume under a nitrogen atmosphere. Once an internal temperature of the reactor reached 731° C., methane and water (26.06 grams charged as steam) were charged to the reaction vessel over 1 hour. The reaction was run until little or no gas and/or liquid product was produced. The reactor was weighed at the end of the run to obtain a final reactor weight.

The total product included 1.06 grams of a crude product, and 8.152 grams of gas. The gas included 0.445 grams of non-condensable hydrocarbons, 4.39 grams (0.10 moles) of $CO_2$, 3.758 grams (0.13 moles) of CO, 0.627 grams of $H_2$ gas, 0.03 grams of $H_2S$ and 0.296 grams of coke.

The selectivity for products containing carbon was calculated based on the weight of carbon containing products divided by weight of asphalt charged to the reactor. For five experiments run as described in Example 24 the mean selectivity for products containing carbon was determined to be: 67 wt % for combined carbon monoxide and carbon dioxide, 7.47 wt % for non-condensable hydrocarbons and 19.88 wt % for crude product and 4.94 wt % for coke.

This example demonstrates a method for contacting the feed with an inorganic salt catalyst/support mixture in the presence of a hydrogen source hydrogen source and steam to produce a crude product and gas and less than 0.1 grams of coke per gram of feed. In the presence of CaO, more the production of gas was increased relative to the production of than crude product. The molar ratio of CO to $CO_2$ was calculated to be 1.3.

Example 25

Contact of a Feed with a Hydrogen Source in the Presence of $MgO/ZrO_2$ Catalyst to Produce a Crude Product The feed and apparatus was the same as described in Example 24. $ZrO_2$ (8.59 grams) was placed on the screen in the reactor.

The feed was heated to 150° C. MgO catalyst (19.82 grams, 0.49 moles) and $ZrO_2$ (29.76 grams, 0.24 moles) were charged to the feed (9.92 grams) to produce an inorganic salt catalyst/catalyst support/feed mixture. The resulting mixture catalyst was metered to the reactor vessel over 0.5 hour (a calculated WHSV of 0.75 $h^{-1}$) to maintain the feed liquid level of 50% of the reactor volume under a nitrogen atmosphere. Once an internal temperature of the reactor reached 731° C., methane and water (48.1 grams charged as steam) were charged to the reaction vessel over 0.5 hour. The reaction was run until little or no gas and/or liquid product was produced. The reactor was weighed at the end of the run to obtain a final reactor weight.

The total product included 1.92 grams of a crude product, and 18.45 grams of gas. The gas included 1.183 grams of non-condensable hydrocarbons, 8.66 grams (0.19 moles) of $CO_2$, 7.406 grams (0.26 moles) of CO, 1.473 grams of $H_2$ gas, 0.125 grams of $H_2S$, and 0.0636 grams of coke. The molar ratio of CO to $CO_2$ was calculated to be 1.4.

The selectivity for products containing carbon was calculated based on the weight of carbon containing products divided by weight of asphalt charged to the reactor. For three experiments run as described in Example 25 the mean selectivity for products containing carbon was determined to be: 65.88 wt % for combined carbon monoxide and carbon dioxide, 11.74 wt % for non-condensable hydrocarbons and 12.35 wt % for crude product and 8.78 wt % for coke.

This example demonstrates a method for contacting the feed with an inorganic salt catalyst/support mixture in the presence of a hydrogen source and steam to produce a crude product and gas and less than 0.1 grams of coke per gram of feed. More gas than crude product was produced in the presence of MgO as compared to Example 24.

Example 26

Contact of a Feed with a Hydrogen Source in the Presence of $ZrO_2$ to Produce a Crude Product The feed and apparatus was the same as described in Example 24. $ZrO_2$ (8.56 grams) was placed on the screen in the reactor.

The feed was heated to 150° C. $ZrO_2$ (24.26 grams) was charged to the feed (5.85 grams) to produce a $ZrO_2$/feed mixture. The resulting mixture catalyst was metered to the reactor vessel over 20 minutes (a calculated WHSV of 0.6 $h^{-1}$) to maintain the feed liquid level of 50% of the reactor volume under a nitrogen atmosphere. Once an internal temperature of the reactor reached 734° C., methane and water (24.1 grams charged as steam) were charged to the reaction vessel over 20 minutes. The reaction was run until little or no gas and/or liquid product was produced. The reactor was weighed at the end of the run to obtain a final reactor weight.

The total product included 0.4 grams of a crude product, and 5.25 grams of gas. The gas included 0.881 grams of non-condensable hydrocarbons, 2.989 grams of $CO_2$, 1.832 grams of CO, 0.469 grams of $H_2$ gas, and 0.34 grams of $H_2S$. From the difference in the initial and final weight of the reactor 1.67 grams of coke was formed. The molar ratio of CO to $CO_2$ was calculated to be 1.

The selectivity for products containing carbon was calculated based on the weight of carbon containing products divided by weight of asphalt charged to the reactor. For two experiments run as described in Example 26 the mean selectivity for products containing carbon was determined to be: 31.73 wt % for combined carbon monoxide and carbon dioxide, 18.93 wt % for non-condensable hydrocarbons and 10.34 wt % for crude product and 39 wt % for coke.

This example demonstrates that contacting a feed with a catalyst support in the presence of a hydrogen source and steam produces a minimal amount of crude product, gases, and coke.

Comparative Example 27

Contact of a Feed with a Hydrogen Source Under Non-Catalytic Conditions to Produce a Crude Product The feed and apparatus was the same as described in Example 24. Silicon carbide, an inert material, (silicon carbide, 13.1 grams) was placed on the screen in the reactor.

The feed was heated to 150° C. Silicon carbide (24.26 grams) was charged to the feed (4.96 grams) to produce a silicon carbide/feed mixture. The resulting mixture catalyst was metered to the reactor vessel over 0.5 hour (a calculated WHSV of 0.4 $h^{-1}$) to maintain the feed liquid level of 50% of the reactor volume under a nitrogen atmosphere. Once an internal temperature of the reactor reached 725° C., methane and water (24.1 grams charged as steam) were charged to the reaction vessel over 0.5 hour. The reaction was run until little or no gas and/or liquid product was produced. The reactor was weighed at the end of the run to obtain a final reactor weight.

The total product included 0.222 grams of a crude product, and 1.467 grams of gas. The gas included 0.248 grams of non-condensable hydrocarbons, 0.61 grams (0.014 moles) of $CO_2$, 0.513 grams (0.018 moles) of CO, and 0.091 grams of $H_2$ gas. From the difference in the initial and final weight of the reactor 3.49 grams of coke was formed.

This example demonstrates that contacting a feed with a hydrogen source and steam produces a greater amount of coke than when the feed is contacted with an inorganic salt catalyst and a catalyst support in the presence of a hydrogen source and steam.

The selectivity for products containing carbon was calculated based on the weight of carbon containing products divided by weight of asphalt charged to the reactor. For two experiments run as described in Example 27 the mean selectivity for products containing carbon was determined to be: 11.75 wt % for combined carbon monoxide and carbon dioxide, 7.99 wt % for non-condensable hydrocarbons and 9.32 wt % for crude product and 65.96 wt % for coke.

The mean selectivity for the products that contain carbon for Examples 24-27 is depicted in FIG. 16. Data points 270 represents the total amount of carbon monoxide and carbon dioxide gases produced. Data points 272 represents amount of non-condensable hydrocarbons produced. Data points 274 represents amount of crude product. Data points 276 represents amount of coke produced and/or unreacted asphaltenes. As shown in FIG. 16, the total amount of carbon monoxide and carbon dioxide gases is enhanced when a feed is contacted with an inorganic salt catalyst as compared to contact with a catalyst support or under thermal conditions. When calcium oxide is used as the inorganic salt catalyst more crude product is produced compared to magnesium oxide, zirconium oxide, or the thermal experiment. Thus, selection of catalyst and controlling the contacting conditions at a temperature of at most 1000° C. allows the composition of the total product to be adjusted. In addition, controlling the contacting conditions limited the conversion of feed to total hydrocarbons is at most 50%, based on the molar amount of carbon in the feed.

In this patent, certain U.S. patents have been incorporated by reference. The text of such U.S. patents is, however, only incorporated by reference to the extent that no conflict exists between such text and the other statements and drawings set forth herein. In the event of such conflict, then any such conflicting text in such incorporated by reference U.S. patents is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A composition comprising a crude product having, per gram of crude product:
    from 0.000001 grams to 0.05 grams of residue, as determined by ASTM Method D5307;
    at least 0.001 grams of hydrocarbons with a boiling range distribution of at most 204° C. (400° F.) at 0.101 MPa;
    at least 0.001 grams of hydrocarbons with a boiling range distribution between about 204° C. and about 300° C. at 0.101 MPa;
    at least 0.001 grams of hydrocarbons with a boiling range distribution between about 300° C. and about 400° C. at 0.101 MPa;
    and at least 0.001 grams of hydrocarbons with a boiling range distribution between about 400° C. and about 538° C. (1,000° F.) at 0.101 MPa, as determined by ASTM Method D2887; and
    wherein the hydrocarbons having a boiling range distribution of at most 204° C. have, per gram of hydrocarbons having a boiling range distribution of at most 204° C.:
    at least 0.001 grams of paraffins, the paraffins comprising iso-paraffins and n-paraffins with a weight ratio of iso-paraffins to n-paraffins of at most 1.4, as determined by ASTM Method D6730.

2. The crude product of claim 1, wherein the crude product has at most 0.00001 grams of total Ni/V/Fe per gram of crude product, as determined by ASTM Method D5863.

3. The crude product of claim 1, wherein the hydrocarbons having a boiling range distribution of at most 204° C. have from about 0.7 to about 0.98 grams of paraffins.

4. The crude product of claim 1, wherein the hydrocarbons having a boiling range distribution of at most 204° C. have from about 0.001 to about 0.5 grams of olefins.

5. The crude product of claim 1, wherein the olefins also have at least 0.001 grams of terminal olefins per gram of olefins.

6. The crude product of claim 1, wherein the olefins comprise terminal and internal olefins, and a molar ratio of terminal olefins to internal olefins is at least 0.4.

7. The crude product of claim 1, wherein API gravity of the crude product is in a range from about 15 to about 30 at 15.5° C., wherein API gravity is as determined by ASTM Method D6822.

* * * * *